United States Patent [19]

Yoshida et al.

[11] Patent Number: 5,894,582
[45] Date of Patent: Apr. 13, 1999

[54] METHOD OF CONTROLLING PARALLEL PROCESSING AT AN INSTRUCTION LEVEL AND PROCESSOR FOR REALIZING THE METHOD

[75] Inventors: Shoji Yoshida; Takashi Hotta; Shigeya Tanaka, all of Hitachi, Japan

[73] Assignee: Hitachi, Ltd., Tokyo, Japan

[21] Appl. No.: 08/596,628

[22] Filed: Feb. 5, 1996

[30] Foreign Application Priority Data

Feb. 13, 1995 [JP] Japan ................................. 7-023940

[51] Int. Cl.$^6$ .................................................. G06F 9/28
[52] U.S. Cl. ........................................ 395/800.23; 395/392
[58] Field of Search .......................... 395/800.23, 800.24, 395/391, 389, 392, 381

[56] References Cited

U.S. PATENT DOCUMENTS 5,233,694  8/1993  Hotta et al. ............................ 395/391
5,442,760  8/1995  Rustad et al. ......................... 395/391
5,613,080  3/1997  Ray et al. ............................. 395/390

OTHER PUBLICATIONS

Pleskun et al. The Performance Potential of Multiple Functional Unit Processors IEEE, 1988.

Primary Examiner—Larry D. Donaghue
Attorney, Agent, or Firm—Antonelli, Terry, Stout & Kraus, LLP

[57] ABSTRACT

Apparatus for realizing instruction level parallel processing includes an instruction buffer for storing instructions fetched from a memory until the instructions are sent from the instruction buffer, an instruction register unit for storing and issuing the sent instructions to a plurality of execution units in the order of instruction, and a judgement part for judging whether it is possible to execute a set of unissued instructions to be next issued, in parallel, as stored in the instruction buffer and/or the instruction register unit and for controlling parallel processing of the set of instructions, based on the result of a judgement on the possibility of parallel processing.

12 Claims, 18 Drawing Sheets

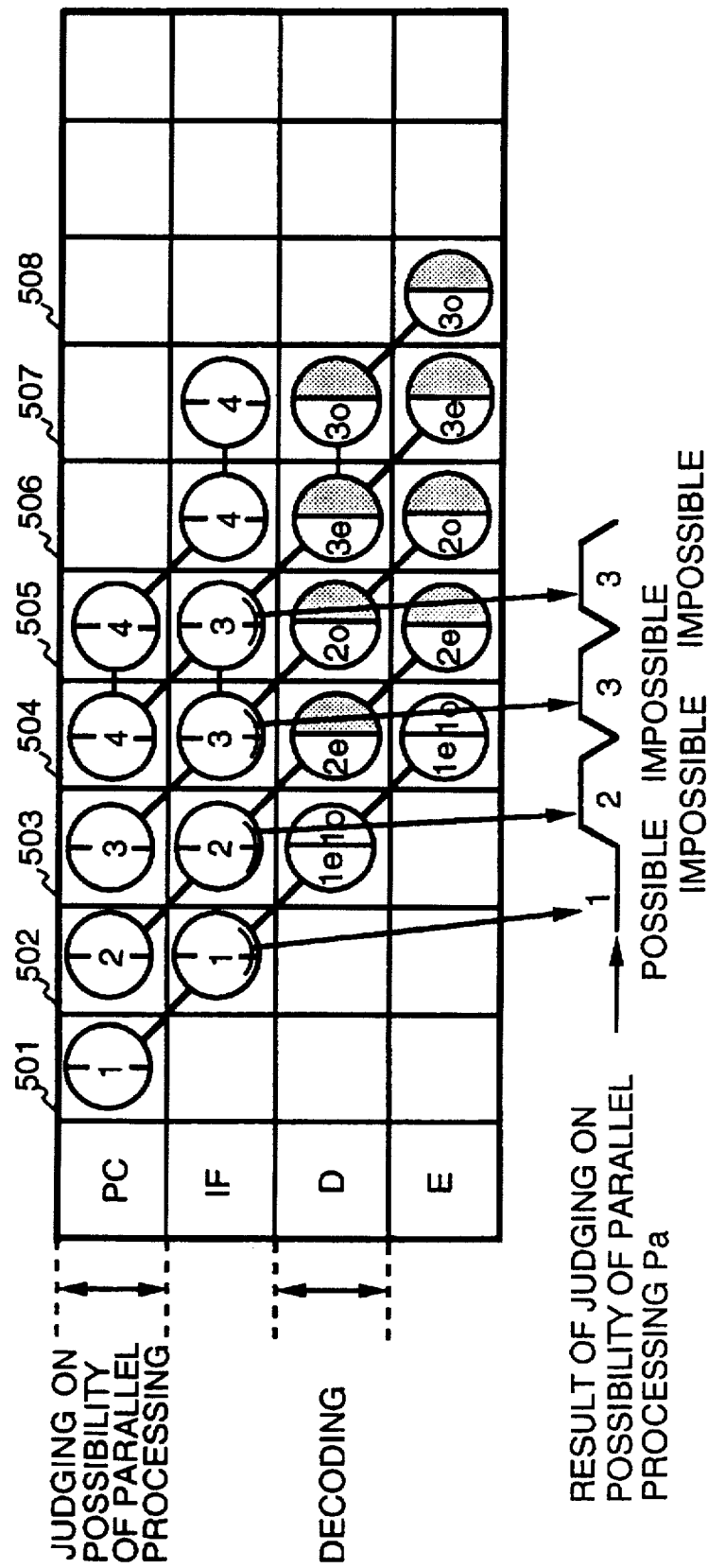

METHOD OF CONTROLLING PARALLEL PROCESSING AT AN INSTRUCTION LEVEL AND PROCESSOR FOR REALIZING THE METHOD

BACKGROUND OF THE INVENTION

The present invention relates to a method of controlling parallel processing at an instruction level and a processor for realizing the controlling method.

As techniques relating to data processing are improved, it has been proposed to improve the performance of a data processing computer by increasing the processing speed by adoption of parallel processing at the instruction level. Existing techniques relating to an instruction level parallel processing control method will be explained in the following by referring to the time charts shown in FIGS. 13–18. Further, an example of a program used in this explanation is shown in FIG.4. The program includes plural instructions ($1e,1o,2e,2o,3e,3o,4e$ and $4o$) executed in the order shown in FIG. 4. In this program, as to the instructions $1e$ and $1o$, parallel processing is possible; further, as to $1o$ and $2e$, parallel processing is impossible; as to $2e$ and $2o$, parallel processing is impossible as to $2o$ and $3e$, parallel processing is possible; as to $3e$ and $3o$, parallel processing is impossible; as to $3o$ and $4e$, parallel processing is possible; and as to $4e$ and $4o$, parallel processing is possible.

In a first existing technique, judging the possibility of parallel processing is carried out at an instruction decoding stage. An operation time chart of the processing is shown in FIG. 13, wherein the abscissa indicates the time lapse, and one division corresponds to one machine cycle. In the vertical direction, the processing stages of the hardware are indicated in order. More particularly, in the PC stage, instructions are stored into an instruction cache; further, in the IF stage, instructions are fetched from the instruction cache and stored into an instruction buffer; in the D stage, instructions are decoded and issued; and in the E stage, instructions, such as a numerical calculation, are implemented by execution units. In the figure, a circle indicates a unit of instructions fetched in a cycle at the stages PC and IF, and a unit of instructions issued in a cycle at the stages D and E. In the following explanation of the operation time chart, at most two instructions are fetched, and instructions are issued. But, in the parallel processing of more than 2 instructions, the operations of the parallel processing are likely carried out.

The fetched instruction unit 1 consists of the instructions $1e$ and $1o$. And, as time passes in the order of machine cycles 301, 302, and so on, the processing proceeds in the order of the stages PC, IF, and so on. Then, at the D stage in the machine cycle 303, as to the instructions $1e$ and $1o$, the possibility of parallel processing is judged. Since the parallel processing of the instructions is possible, both the instructions $1e$ and $1o$ are issued. Further, in the machine cycle 304, the fetched instruction unit 2 goes into the stage D, and the parallel processing of the instructions $2e$ and $2o$ is judged to be impossible. Then, only the instruction $2e$ is issued. In the figure, a hatched instruction indicates an instruction not to be issued. Further, in the machine cycle 305, the fetched instruction unit 3 goes into the stage D, and the parallel processing of the instructions $2o$ and $3e$ is judged to be possible. Then, both the instructions are issued. And, in the machine cycle 306, the fetched instruction unit 4 goes into the stage D, and the parallel processing of the instructions $3o$ and $4e$ is judged to be possible. Thus, both instructions are issued.

In a second existing technique, a stage of judging the possibility of parallel processing is inserted between the instruction fetching stage IF and the instruction decoding stage D, and an operation time chart of the processing is shown in FIG. 14.

As shown in the figure, the D1 stage of judging the possibility of the parallel processing is added, and then the D2 stage becomes the decoding stage. In the machine cycle 403, the fetched instruction unit 1 goes into the stage D1, and the parallel processing of the instructions $1e$ and $1o$ is judged to be possible. Thus, both the instructions $1e$ and $1o$ are issued. Then, in the machine cycle 404, the fetched instruction unit 2 goes into the stage D1, and the parallel processing of the instructions $2e$ and $2o$ is judged to be impossible. Thus, only the instruction $2e$ is issued. In the same manner as mentioned above, in each cycle of the machine cycles 405 and 406, the possibility of parallel processing of a pair of the instructions $2o$ and $3e$, and a pair of the instructions $3o$ and $4e$, is judged to be possible, respectively. Thus, each pair of instructions is issued.

In a third existing technique, an instruction buffering stage, for holding fetched instructions until the instructions are issued, is incorporated in the first existing technique, and the instructions stored in the instruction buffer are checked to determine whether they conflict with each other at the decoding stage in order to judge the possibility of parallel processing of the instructions, the operation time chart of which is shown in FIG. 15.

In the figure, IBR indicates the stage of fetching and storing instructions into the instruction buffer. As shown in the figure, in the machine cycle 1103, the fetched instruction unit 1 goes into the stage D, and the parallel processing of the instructions $1e$ and $1o$ is judged to be possible. Thus, the instructions $1e$ and $1o$ are issued. Further, in the machine cycle 1104, the fetched instruction unit 2 goes into the stage D, and the parallel processing of the instructions $2e$ and $2o$ is judged to be impossible. Thus, only the instruction $2e$ is issued. And, like operations follow.

In a fourth existing technique, an instruction buffering stage for holding fetched instructions until the instructions are issued, is incorporated in the second existing technique, and, as to the instructions stored in the instruction buffer, a stage for judging the possibility of parallel processing is inserted between the instruction buffering stage IBR and the instruction decoding stage D, and an operation time chart of the processing is shown in FIG. 16.

As shown in the figure, the D1 stage of judging the possibility of parallel processing is added, and then the D2 stage becomes the decoding stage. In the machine cycle 1203, the fetched instruction unit 1 goes into the stage D1, and the parallel processing of the instructions $1e$ and $1o$ is judged to be possible. Thus, both the instructions $1e$ and $1o$ are issued. Then, in the machine cycle 1204, the fetched instruction unit 2 goes into the stage D1, and the parallel processing of the instructions $2e$ and $2o$ is judged to be impossible. Thus, only the instruction $2e$ is issued. And, like operations follow.

The first to fourth existing techniques adopt the method of judging the possibility of parallel processing after the instructions to be judged are issued from the instruction register unit. And, after the judgement of the possibility of parallel processing, execution of the issued instructions is started.

Now, there is mentioned in JP-A-130634/1990 and JP-A214785/1994, a fifth existing technique which checks the fetched instructions to determine whether they conflict with each other, in order to judge the possibility of parallel processing of the instructions, before they are written into the instruction cache. That is, the technique provides for determination of the possibility of parallel processing of the instructions to be written into the instruction cache, and for storage of the results of judging the possibility of parallel processing. Then, in reading out instructions from the instruction cache, the judgement results are simultaneously read out, and the instruction level parallel processing is executed by using the judgement results.

An operation time chart of the fifth existing method is shown in FIG. 18. As shown in the figure, in the machine cycle 502, the fetched instruction unit 1 is read out from the instruction cache, and the judgement result that the parallel processing is possible as to the instructions 1e and 1o is also read out at the same time. Then, in the machine cycle 503, the instructions 1e and 1o are issued together. And, in the machine cycle 503, the fetched instruction unit 2 is read out from the instruction cache, and the judgement result that the parallel processing is impossible as to the instructions 2e and 2o is also read out at the same time. And, only the instruction 2e is issued in the machine cycle 504. Then, in the machine cycle 505, only the instruction 2o is issued.

In the above-mentioned processing, the possibility of parallel processing as to the instructions 2o and 3e is not performed. Therefore, the instructions 2o and 3e are never issued together. In the machine cycle 505, the fetched instruction unit 3 is read out from the instruction cache, and the judgement result that the parallel processing is impossible as to the instructions 3e and 3o is also read out at the same time. Thus, only the instruction 3e is issued in the machine cycle 506. Then, in the machine cycle 507, only the instruction 3o is issued.

However, the above-mentioned existing techniques have the following problems.

The first and third existing techniques have a problem that one machine cycle becomes long and the operation frequency decreases, since the series of processing steps to determine the possibility of parallel processing is carried out after instructions are set in the instruction register unit, and the instructions are decoded after determining the possibility of parallel processing and are executed, so as to be implemented in one machine cycle.

In the second and fourth existing techniques, since an exclusive stage for determining the possibility of parallel processing is provided, the parallel processing is executed without any decrease of the operating frequency. However, the execution speed of a branch instruction decreases due to the addition of the exclusive stage, and the penalty involved in executing the branch instruction increases, which deteriorates the performance of the processing.

The penalty is explained with reference to FIG. 17. Assuming that the instruction 1e is a branch instruction, after the instruction 1e is implemented and a destination address is decoded, an instruction at the destination address is fetched. Then, as shown in the figure, it takes 3 cycles of penalty from execution of the instruction 1e to execution of the instruction at the destination address.

In the fifth existing technique, the above-mentioned problems of the first to fourth existing techniques are avoided since the operation frequency does not decrease by judging the possibility of parallel processing before writing instructions into the instruction cache and an exclusive stage for judging is not added. However, the fifth existing technique has a problem in that, the possibility of parallel processing is judged only as to instructions of the same line of the instruction cache. That is, since the possibility of parallel processing is not judged for instructions of different lines of the instruction cache, the cases for which parallel processing is executed are fewer than in the other existing techniques and the processing speed becomes lower. For example, in the first to fourth existing techniques shown in FIGS. 13–16, it takes four machine cycles to execute the instructions 1e to 3o. On the other hand, in the fifth existing technique, it takes five machine cycles to execute the instructions 1e to 3o, as shown in FIG. 18.

SUMMARY OF THE INVENTION

An object of the present invention is to provide a parallel processing method and an apparatus for realizing a method of judging the possibility of parallel processing at the instruction level as to all combinations of successively executed instructions without decrease of the operation frequency and need for an additional processing stage.

To attain the above-mentioned object, the present invention provides an instruction level parallel processing method and an apparatus for realizing the method, comprising the steps of storing instructions fetched from a memory in an instruction buffer until the instructions are issued, sending the stored instructions into an instruction register unit for issuing the sent instructions to a plurality of execution units in the order of execution, judging whether it is possible to execute a set of unissued instructions to be next issued, in parallel, as stored in the instruction buffer and the instruction register unit, and controlling parallel processing of the set of instructions based on the result of the judgement.

The present invention further provides an instruction level parallel processing method and an apparatus for realizing the method, comprising the steps of writing a plurality of units (or described as sets) of instructions fetched from a memory into an instruction cache and simultaneously judging whether it is possible to execute each unit of the fetched instructions in parallel, storing the fetched instructions in an instruction buffer until the instructions are issued, sending the stored instructions to an instruction register unit for issuing said sent instructions to a plurality of execution units in the order of execution, judging whether it is possible to execute a set of unissued instructions to be next issued, in parallel, based on the result of the judgement carried out in writing the set of unissued instructions into the instruction cache, if the number of instructions stored in the instruction buffer and the instruction register unit is less than the number of the plurality of execution units, and judging, in addition to the judgement carried out in writing the set of unissued instructions into the instruction cache, whether it is possible to execute the set of unissued instructions stored in the instruction buffer and/or the instruction register unit if the number of instructions stored in the instruction buffer and the instruction register unit is not less than the number of the plurality of execution units, and controlling parallel processing of the set of instructions based on the result of the judgement.

The above-mentioned judgement of the possibility of parallel processing is carried out by using the contents of the instruction register unit, information on instructions stored in the instruction buffer and a result of the judgement of the possibility of parallel processing in the previous machine cycle.

Then, in controlling parallel processing of the set of instructions, if the parallel processing of the set of instructions is judged impossible, the parallel processing is equivalently suppressed and each one of the sets of instructions is executed one by one in the order of execution. The equivalent suppression of the parallel processing is realized, for example, by stopping outputs of executed results using such means as a gate circuit.

By the above-mentioned method, the instruction register unit has only to issue instructions, since the possibility of parallel processing as to the set of instructions to be next issued, as stored in the instruction buffer or the instruction register for the execution units, is judged, and the parallel processing is controlled by stopping outputs of the executed results if the parallel processing is impossible. Then, since it is not necessary to carry out the decoding and the judgement of the possibility of parallel processing in the same machine cycle, a decrease of the operation frequency is prevented.

Further, since it is not necessary to provide an exclusive stage for the judgement of the possibility of parallel processing, an increase in the number of machine cycles due to execution of branch instructions is also prevented.

And, the possibility of parallel processing can be judged as to instructions executed successively not only for a unit of fetched instructions of the same line stored in the instruction cache, but also for two instructions in different lines. Then, since all the sets of successive instructions which can be processed in parallel are executed in parallel, the cases in which the parallel processing can be executed is increased in comparison with the existing methods, which improves the processing performance.

The effects of the present invention will be summarized as follows. At first, a high operation frequency can be attained since it is not necessary to judge the possibility of parallel processing after issuing instructions from the instruction register unit. Deterioration of the processing performance due to the addition of a new processing stage is not caused. And, the method of the present invention is not restricted to parallel processing being judged only as to a unit of fetched instructions of the same line stored in the instruction cache. Further, the possibility of parallel processing is carried out as to all the sets of unissued instructions stored in the order of execution in the instruction buffer and/or the instruction register provided for the execution units.

And, even if the number of instructions stored in the instruction buffer and the instruction register for the execution units is less than a predetermined number, the possibility of parallel processing can be judged for each unit of fetched instructions by using the result of the judgement of the possibility of parallel processing carried out in fetching the unit of instructions into the instruction cache, which further improves the parallel processing performance.

BRIEF DESCRIPTION OF THE DRAWINGS

FIG. 18 is a time chart for explaining operation of parallel processing in the fifth existing technique.

DETAILED DESCRIPTION OF THE EMBODIMENTS

Hereinafter, details of the present invention will be explained based on various embodiments with reference to the drawings.

Figure 1:
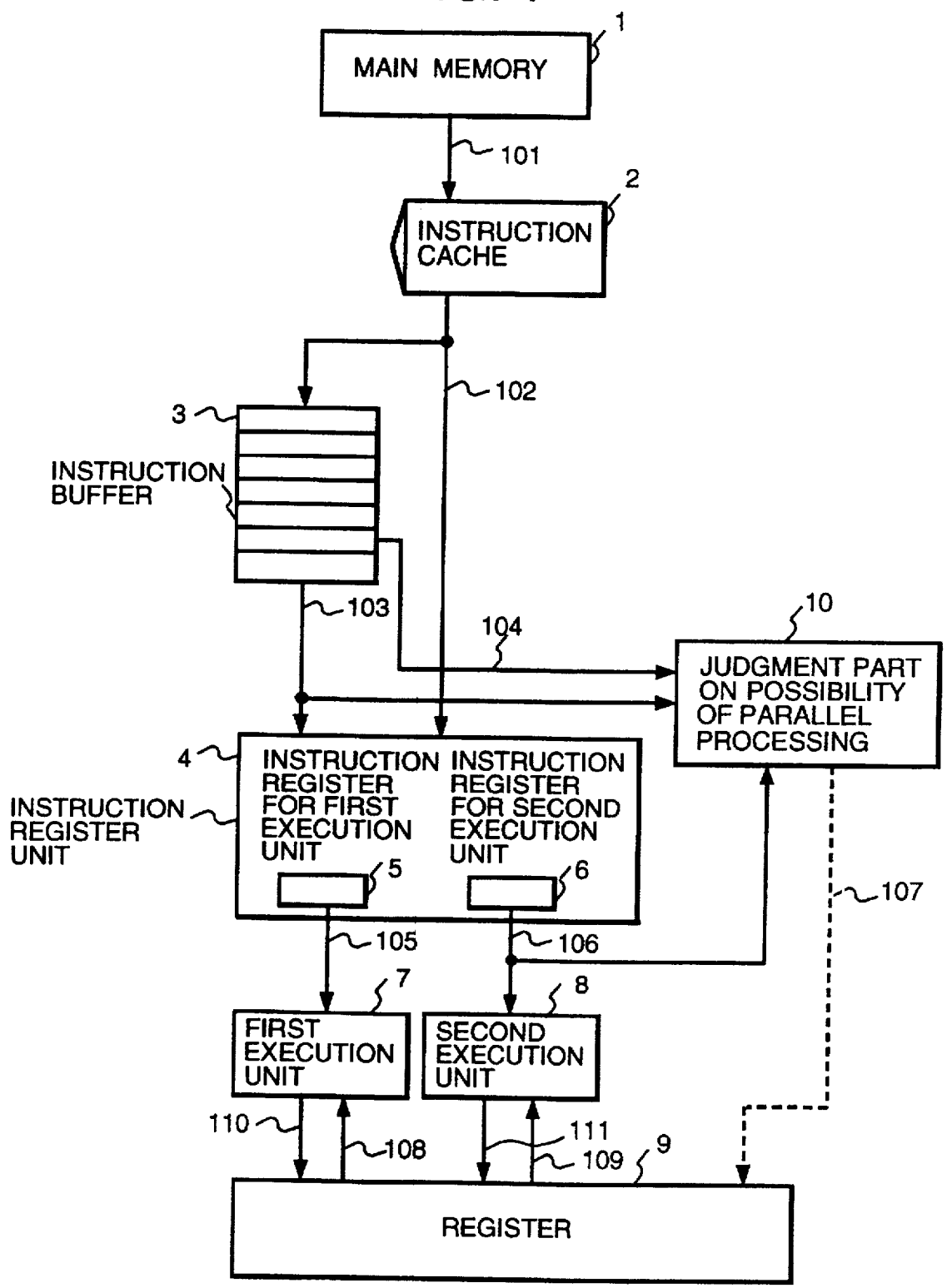
FIG. 1 is a schematic block diagram of a processor of the first embodiment.
Figure 2:
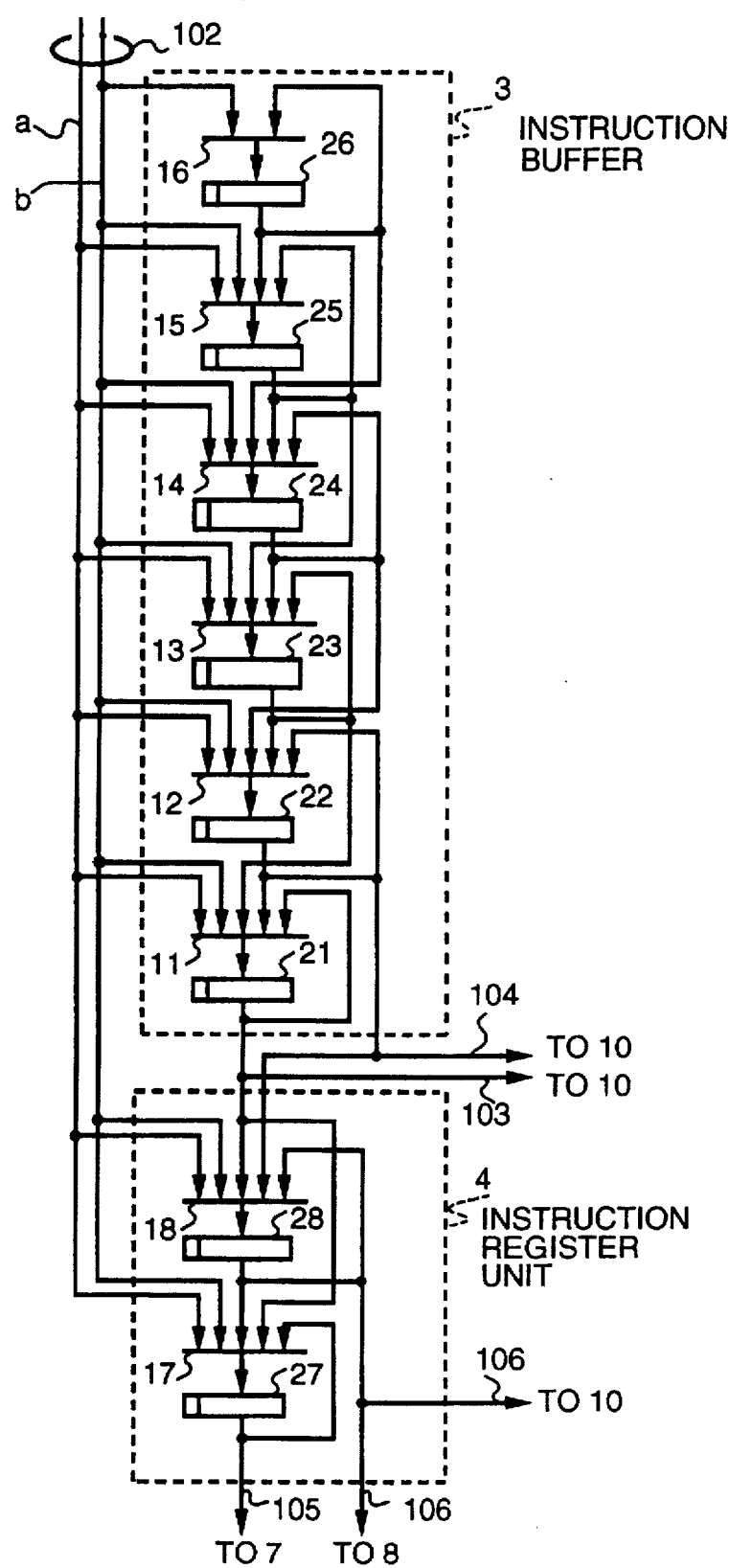
FIG. 2 is a schematic circuit diagram of an instruction buffer and an instruction register unit of the first embodiment.
Figure 3:
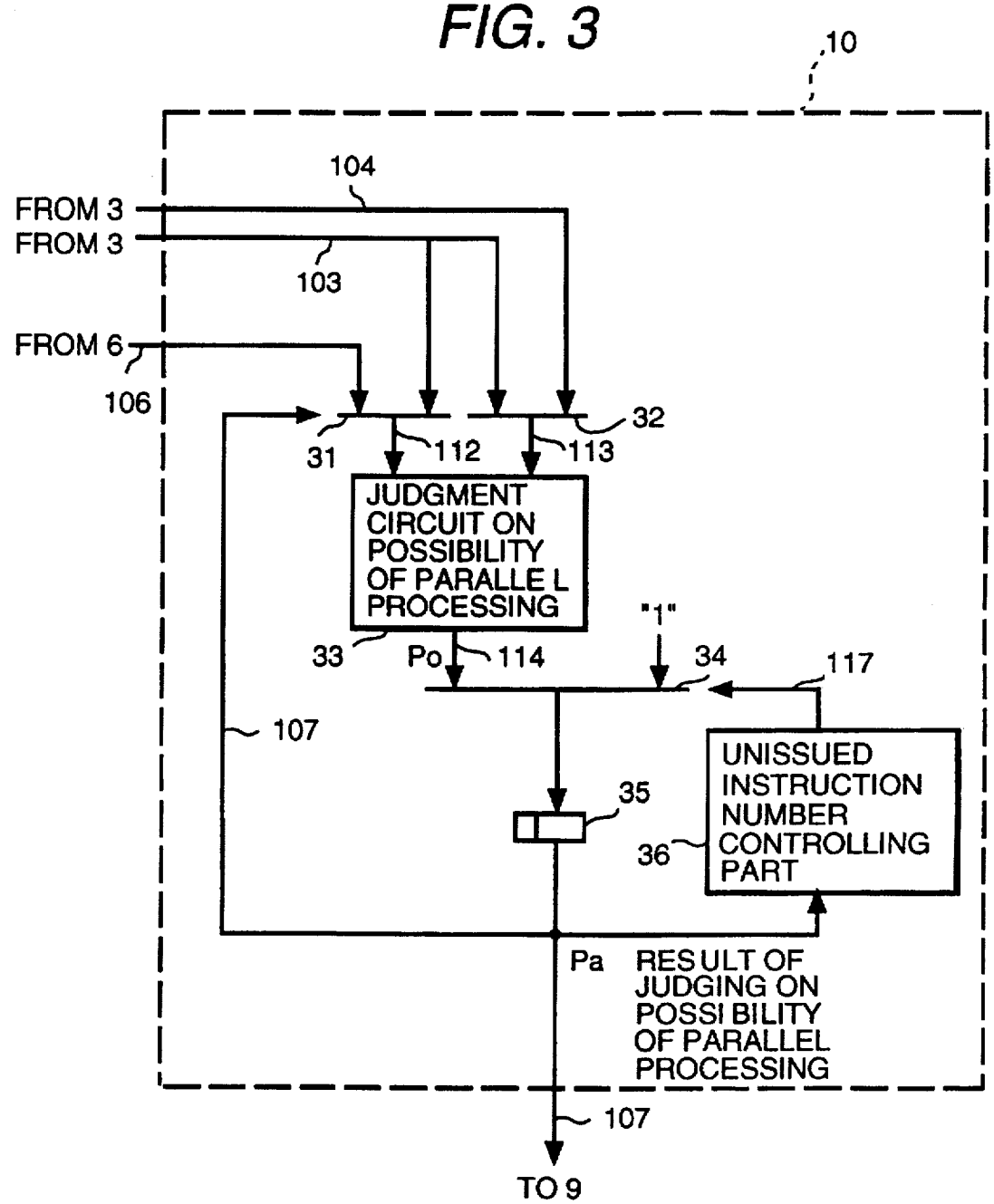
FIG. 3 is a schematic circuit diagram of a judgement part on the possibility of parallel processing which is a distinctive part of the first embodiment.

By using FIGS. 1–7, a processor of the first embodiment to which an instruction level parallel processing method of the present invention is applied, will be explained. FIG. 1 shows a main part of the processor relating to the instruction level parallel processing. And, FIGS. 2 and 3 show the detailed compositions of main sub-parts, respectively. FIGS. 4–7 show operations of the parallel processing which is carried out in the embodiment.

FIG. 1 shows the main part of the processor suitable for executing the instruction level parallel processing by a method of the present invention, in which a unit of two instructions are executed in parallel in the embodiment. At first, instructions stored in a main memory 1 are fetched and registered into an instruction cache via line 101. Codes of the instructions registered in the instruction cache 2 are sent and stored into an instruction buffer 3 using a FIFO (First-In-First-Out) method, in the order of execution, via a line 102. The codes of the instructions (hereinafter simply described as the instruction codes) stored in the instruction buffer 3 are sent to an instruction register unit 4 in order from the lowest code (the oldest one of the instruction codes stored in the instruction buffer 3) via a line 103. Then, if an instruction code is not stored in the instruction register unit 4 in the initial start state, instruction codes are fed to the instruction register unit 4 from the instruction cache 2, not via the instruction buffer 3, but directly via the line 102. The instruction register unit 4 of the embodiment is composed of an instruction register 5 and an instruction register 6. The instruction register 5 is provided for the first execution unit 7, and the instruction register 6 is provided for the second execution unit 8. Each one of the execution units 7 and 8 has a decoder at its input part, and is able to execute a decoded instruction code by taking in necessary data from a register 9 via lines 110 and 111, respectively, based on the decoded results. The execution results are stored into the register 9 via lines 108 and 109.

A judgement part 10 on the possibility of parallel processing, which is one of distinct features of the present invention, takes in two instruction codes of judgement objects, and judges whether it is possible to execute the two instruction codes in parallel by a well known judgement method based on the contents of the instruction codes (kinds of processing such as addition, subtraction, multiplication, branching, etc.) and interrelations between the addresses to which the execution results are to be stored and/or the addresses at which the data are to be fetched for the execution from the register 9. Then, the judgement result Pa is output to the register 9 via line 107. And, there are two cases in the present judgement, that is, a case in which parallel processing as to both of the two instruction codes stored in the registers 5 and 6 is judged to be possible in the previous judgement, and a case in which parallel processing is to be judged impossible in the previous judgement.

In the former case, the two instruction codes stored in the instruction registers 5 and 6 are issued to the execution units 7 and 8, respectively, and parallel processing is executed. Then, as to the two instruction codes to be next executed, namely, the lowest instruction code (for example, 1e shown in FIG. 4) and the next lowest one (for example, 1o), in the instruction buffer 3, the possibility of parallel processing is judged.

In the latter case, the instruction code stored in the instruction register 6 for the second execution unit, of the two instruction codes which have been stored in the registers 5 and 6, is not issued and remains. Then, the possibility of parallel processing is judged as to the instruction code (for example, 2o) stored in the register 6 for the second execution unit and the lowest instruction code (for example, 3e) in the instruction buffer 3.

In the above-mentioned two cases, the two instruction codes are input to the judgement part 10 on the possibility of parallel processing via the two lines 103, 104 and line 106.

Although two instructions are processed in parallel using two execution units, in this embodiment, the present invention is not restricted to parallel processing of two instructions, and so the present invention can be naturally applied to the parallel processing of more than two instructions by using more than two instruction registers and more than two execution units.

FIG. 2 shows an example of the detailed compositions of the instruction buffer 3 and the instruction register unit 4 of the embodiment shown in FIG. 1. As shown in the figure, the instruction buffer 3 is composed of six selectors 11–16 and six buffer registers 21–26, provided in correspondence to the selectors, for storing six instruction codes. The instruction buffer 3 has a well known composition, and the selector 11 of the instruction buffer 3 selects one of the instruction codes of the line 102 and outputs of the buffer registers 21, 22 and 23, and outputs the selected instruction code to the buffer register 21. The line 102 consists of two lines 102a and 102b, which carry two instruction codes (for example, 1e and 1o shown in FIG. 4) in the order of execution. The other selectors 12–16 have the same composition as that of the selector 11. The output of the buffer register 21 is sent to the instruction registers 5 and 6, and to the judgement part 10, via the line 103. And, the output of the buffer register 22 is sent to the instruction register 6, and the judgement part 10 via the line 104.

Like the instruction buffer 3, as shown in FIG. 2, the instruction register unit 4 is composed of two selectors 17 and 18 and two buffer registers 27 and 28 provided correspondence to the selectors, and the instruction register unit 4 is composed as a part substantially extended from the lowest stage of the instruction buffer 3. Then, a pair consisting of the selector 17 and the buffer register 27 corresponds to the instruction register 5 for the first execution unit, and a pair consisting of the selector 18 and the buffer register 28 corresponds to the instruction register 6 for the second execution unit. The selector 17 selects one of an instruction code via the line 102 connected to the instruction cache 2, an instruction code stored in the buffer register 27 of the instruction register 5 for the first execution unit and an instruction code stored in the buffer register 28 of the instruction register 6 for the second execution unit, and outputs the selected instruction code to the buffer register 27. Likewise, The selector 18 selects one of an instruction code via the line 102 connected to the instruction cache and an instruction code stored in the buffer register 28 of the instruction register 6 for the second execution unit, and outputs the selected instruction code to the buffer register 28.

By means of the instruction buffer 3 and the instruction register unit 4, the instruction codes fed in the order of execution from the instruction cache 2 are stored in order in the instruction register 5 for the first execution unit, the instruction register 6 for the second execution unit, and the buffer registers from the lowest one to the upper ones of the instruction buffer 3. If significant instructions are stored in the instruction buffer 3 and the instruction register unit 4, the instructions are shifted in the lower direction in the order of the buffer registers 26, 25, . . . . . 22, 21, 28 and 27. And, if significant instructions are not stored, the selectors 11–18 are controlled so as to fetch and store instructions newly received from the instruction cache 2.

An instruction code stored in the lowest buffer register 21 of the instruction buffer 3 is input to the judgement part 10 via the line 103, and an instruction code stored in the next lowest buffer register 22 of the instruction buffer 3 is input to the judgement part 10 via the line 104. And, an instruction code stored in the buffer register 28 of the instruction register 6 for the second execution unit is input to the judgement part 10 via the line 106.

FIG. 3 shows an example of the detailed composition of the judgement part 10 in the embodiment shown in FIG. 1. As shown in the figure, the judgement part 10 comprises a selector 31 for the first instruction, a selector 32 for the second instruction, a judgement circuit 33 on the possibility of parallel processing, a selector 34 of a judgement result on the possibility of parallel processing, a latch 5 of the selected judgement result and an unissued instruction number controlling part 36.

The selector 31 for the first instruction selects one of instruction codes sent via the lines 103 and 106, based on the previous judgement result of the possibility of parallel processing, Pa, stored in the latch 5 of the selected judgement result. That is, if Pa is "0", since the previously judged two instructions are executed in parallel, the selector 31 selects the lowest instruction code (the line 103) in the instruction buffer 3. On the other hand, if Pa is "1", since the previously judged instructions are not executed in parallel, the selector 31 selects an instruction code (the line 106) stored in the register 6 for the second execution unit.

At the same time, the selector 32 for the second instruction selects one of the instruction codes sent via the lines 103 and 104, based on the previous judgement result of the possibility of parallel processing, Pa, stored in the latch 5. That is, if Pa is "0", the selector 32 selects the next lowest instruction code (the line 104) in the instruction buffer 3. On the other hand, if Pa is "1", the selector 32 selects the lowest instruction code (the line 103) in the instruction buffer 3.

The judgement circuit 33 on the possibility of parallel processing judges whether it is possible to execute the two instruction codes selected by the selectors 31 and 32. In this regard, it is judged whether it is possible to execute the two instruction codes in parallel by a well known judgement method based on the contents of the instruction codes (kinds of processing such as addition, subtraction, multiplication, branching, etc.) and interrelations between the addresses to which the execution results are to be stored and/or the addresses at which the data are to be fetched for the execution from the register 9. The judgement result Po is set as "0" if the two instructions can be executed in parallel, otherwise the result is set as "1"

The selector 34 selects either the judgement result Po output from the judgement circuit 33 or a logical value "1", based on an output 117 of the unissued instruction number controlling part 36, and outputs the selected value as the judgement result Pa. The latch 35 of the selected judgement result latches the judgement result Pa output from the selector 34. The unissued instruction number controlling part 36 takes in the number of instructions read out from the instruction cache 2, the number of instructions issued as a significant instruction and the judgement result Pa, calculates the number of unissued instructions in the instruction buffer 3 based on the taken in data, and outputs the calculated number on line 117. The selector 34 carries out a selecting operation based on the number on line 117. In the embodiment, since the judgement circuit 33 judges the possibility of parallel processing as to insignificant instructions if the number on line 117 is "0", the selector 34 selects the value "1" and sets "1" to Pa, which means the impossibility of parallel processing. Then, if the number 117 is more than one, the selector 34 sets the output Po of the judgement circuit 33 to Pa.

In the following, the operations of the first embodiment having the above mentioned composition will be explained.

The instruction register unit 4 receives two instruction codes in order from the instruction buffer 3 via the line 103 if more than one significant instruction is held in the instruction buffer 3, and sets an instruction code to be first executed into the instruction register 5 for the first execution unit, and an instruction code to be next executed into the instruction register 6 for the second execution unit.

On the other hand, the instruction register unit 4 receives two instruction codes in order from the instruction cache 2 via the line 102 if more than one significant instruction is not held in the instruction buffer 3, and sets the two instruction codes, in the order of execution, into the instruction register 5 for the first execution unit and the instruction register 6 for the second execution unit, respectively.

In the following, the operations of the judgement part 10 on the possibility of parallel processing will be explained. At first, if two instructions which can be executed in parallel were issued in the previous cycle, the value "0" is latched in the latch 35 of the judgement part 10. Then, referring to the value latched in the latch 35, the selectors 31 and 32 for the first and second instructions select the instruction codes sent via the lines 103 and 104, respectively. And, as to the lowest and next lowest instructions in the instruction buffer 3, the possibility of parallel processing is judged and the judgement result Po 114 is obtained.

Then, if only one instruction code was issued due to the impossibility of parallel processing in the previous cycle, an unissued instruction code remains in the instruction register 6 for the second execution unit and the value "1" is latched in the latch 35. And, referring to the value latched in the latch 35, the selectors 31 and 32 for the first and second instructions selects the instruction codes sent via the lines 103 and 106, respectively. Then, as to the lowest instructions in the instruction buffer 3 and the instruction remaining in the instruction register 6, the possibility of parallel processing is judged and the judgement result Po is obtained.

The register 9 controls the processing of writing the executed result of the second execution unit 8 into the register 9, based on the judgement result Pa. That is, if two instruction codes are issued and executed in parallel, it is permitted to write the results executed by the first and second execution units into the register 9 via the lines 108 and 109. However, if only one instruction is issued, writing the result executed by the second execution unit 8 into the register 9 is prohibited by controlling a gate provided at an inlet part of the register 9. By the above-mentioned composition, the issue of an instruction stored in the instruction register 6 for the second execution unit is equivalently suppressed.

It is explained above that, if only one instruction is issued, writing the result executed by the second execution unit 8 into the register 9 is prohibited by controlling the gate at the inlet part of the register 9. However, it is also possible to prohibit the issuing of an instruction code to the second execution unit 8 from the instruction register 6 for the second execution unit, instead of the above-mentioned prohibition method. In effect, it should be only equivalently prohibited to execute an instruction stored in the instruction register 6 for the second execution unit.

Figure 4:
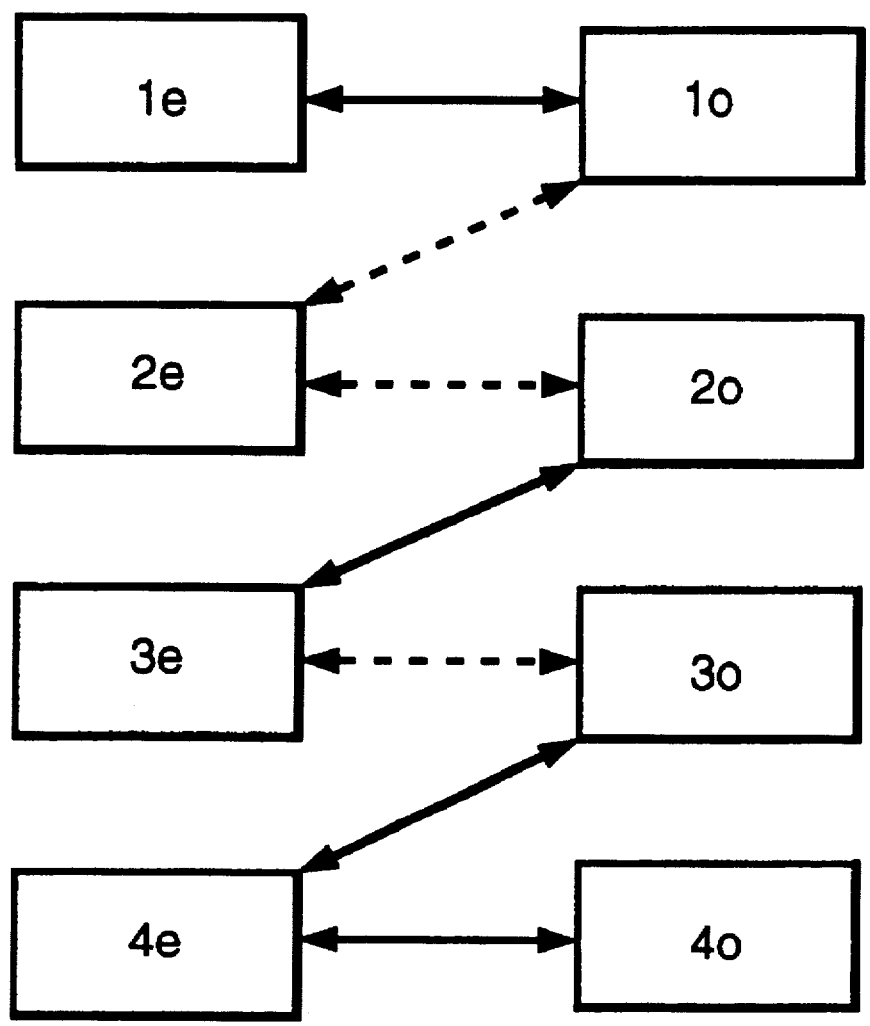
FIG. 4 is a diagram of an example of program steps in which parallel processing is executed.

The above-mentioned operations will be further explained by using the example of a program shown in FIG. 4. As shown in FIG. 4, it of the program are executed in the order of 1e, 1o, 2e, 2o, . . . , 4e and 4o. And, it is also assumed that, as to the instructions 1e and 1o, the parallel processing is possible; as to 1o and 2e, parallel processing is impossible; as to 2e and 2o, parallel processing is impossible; as to 2o and 3e, parallel processing is possible; as to 3e and 3o, parallel processing is impossible; as to 3o and 4e, parallel processing is possible; and as to 4e and 4o, parallel is possible.

Figure 5:
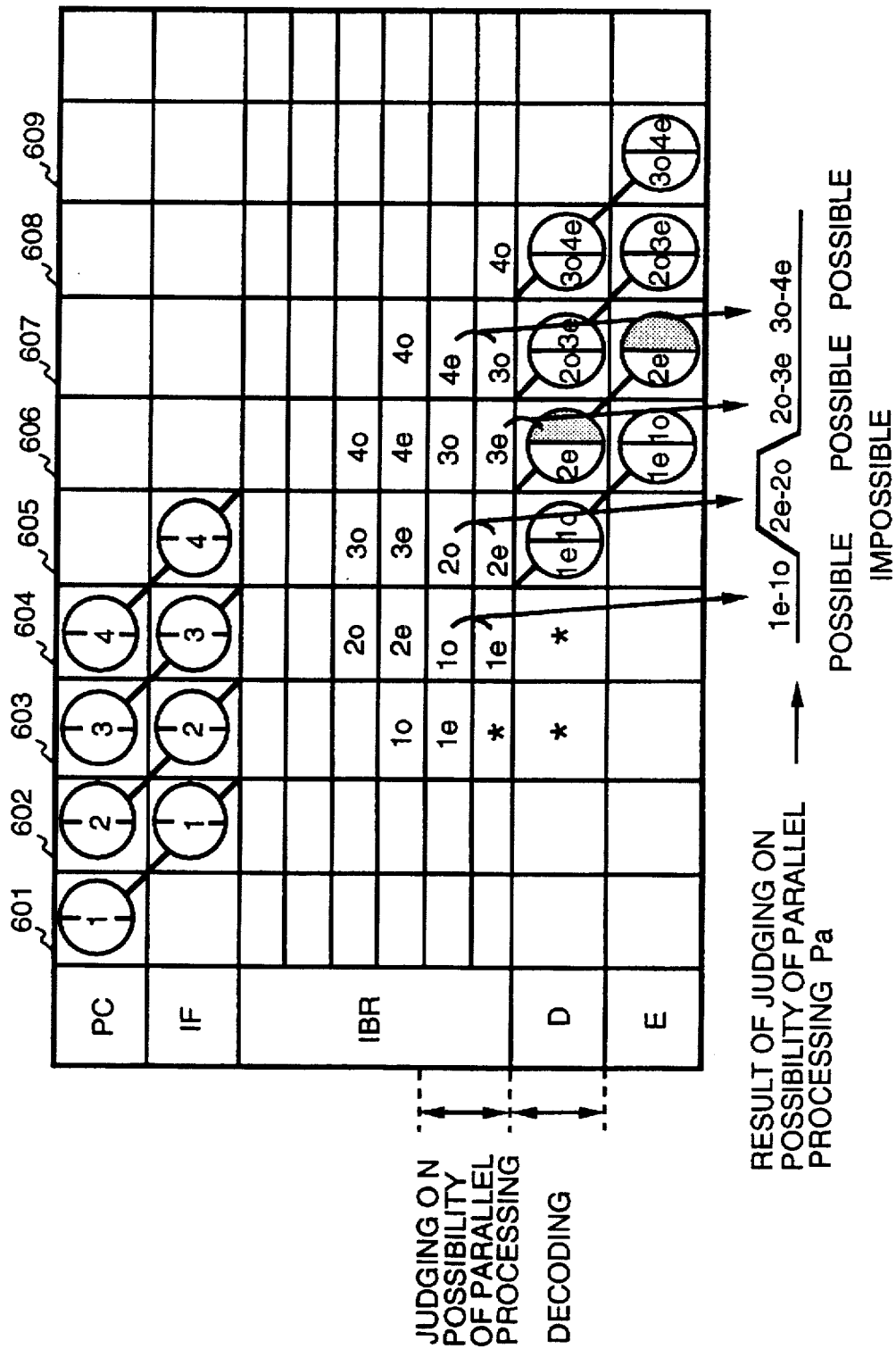
FIG. 5 is a time chart for explaining operations of the parallel processing in the first embodiment.
Figure 6:
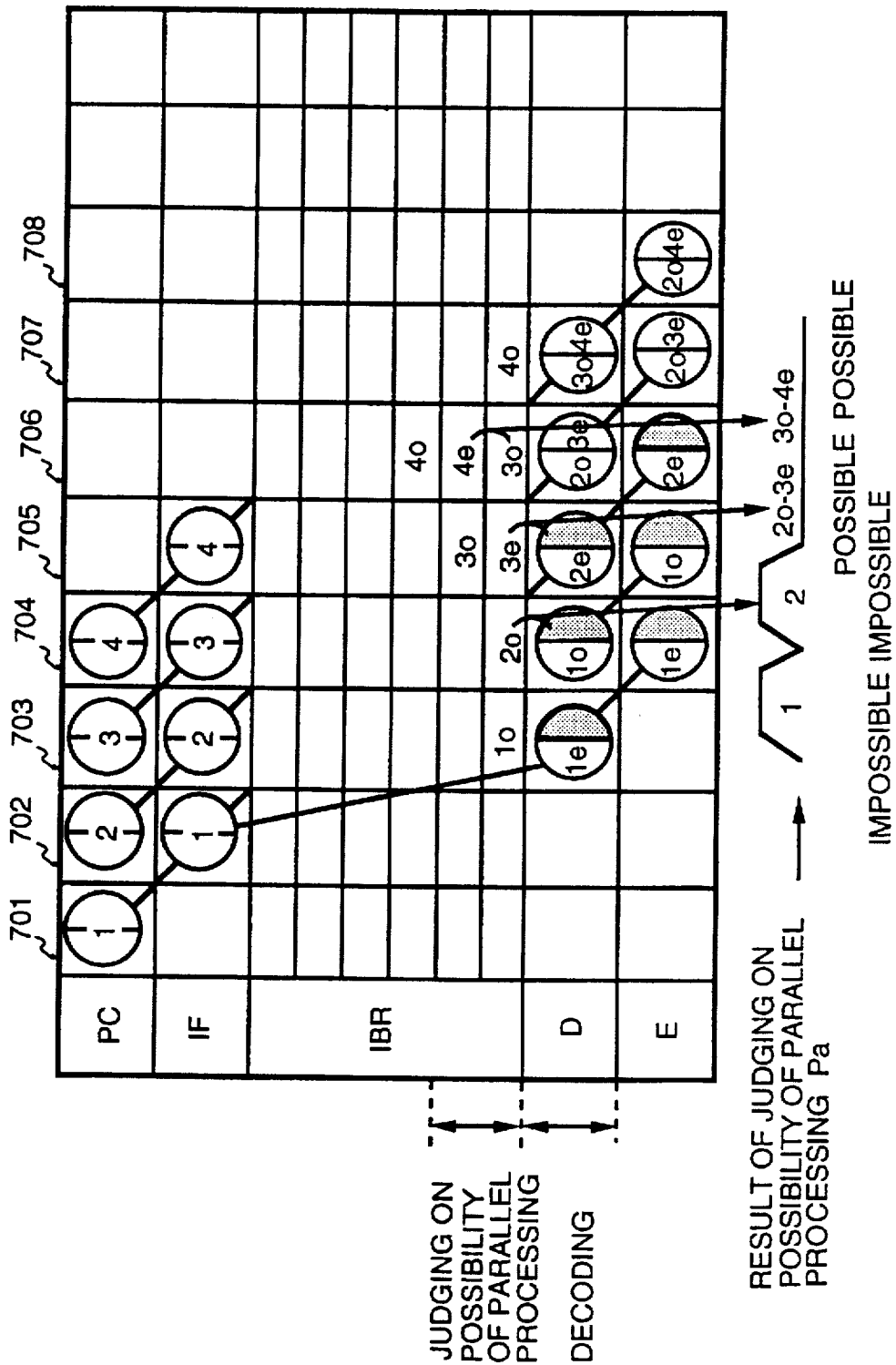
FIG. 6 is a time chart for explaining operations of the parallel processing in the first embodiment.

The operation time charts are shown in FIGS. 5 and 6 in the case of processing the program of FIG. 4 using the processor shown in FIGS. 1–3. The abscissa indicates the time lapse, and one division corresponds to one machine cycle. In the vertical direction, the processing stages of the hardware are indicated in order.

In the PC stage, instructions are stored into the instruction cache 2; in the IF stage, instructions are fetched from the instruction cache 2 and stored into the instruction buffer 3; in the D stage, instructions are decoded by the execution units 7 and 8; and in the E stage, instructions such as for a calculation are implemented by the execution units 7 and 8. And, in the IBR stage, the instruction buffer 3 having a storage area for storing six instructions is operated.

As shown in FIG. 5, the units of fetched instructions 1, 2, 3 and 4 are stacked in the instruction buffer 3 in the order of the machine cycles 602, 603, 604, 605, . . . . In the machine cycle 604, the instruction codes 1t and 1o to be next issued are held in the lowest and next lowest buffer registers. In the cycle, the objects to be judged by the judgement part 10 to determine the possibility of parallel processing are the instruction codes 1e and 1o. More particularly, since the instruction codes 1e and 1o can be executed in parallel, the judgement part 10 outputs the value "0" as the judgement result Pa.

By referring to the value "0" of the judgement result Pa, the instruction codes 1e and 1o are simultaneously issued from the instruction register unit 4 to the first and second execution units 7 and 8, respectively. That is, the two instruction codes are issued from the registers 5 and 6 for the execution units to the corresponding first and second execution units 7 and 8, respectively, and decoded by the units 7 and 8.

In the machine cycle 605, the instruction codes 2e and 2o to be next issued are held in the lowest and next lowest buffer registers. Then, it is judged by the judgement part 10 that the instruction codes 2e and 2o can not be executed in parallel. As the result, in the machine cycle 606, only the instruction code 2e is equivalently issued as a significant instruction.

On the other hand, in the machine cycle 606, the possibility of parallel processing is judged as to the instruction code 2o, which was not issued as a significant instruction and which remains in the register 6 for the second execution unit, and the instruction code 2e stored in the lowest buffer register in the instruction buffer 3, and the judgement result Pa (="0") is output. Then, in the machine cycles 607–608, at the same time as the instruction code 2o in the instruction register 6 is transferred to the instruction register 5 for the first execution unit, the instruction code 3e stored in the lowest buffer register in the instruction buffer 3 is sent to the instruction register 6. And, in the machine cycle 607, the instruction codes 2o and 3e are decoded, and in the machine cycle 608, the instruction codes 2o and 3e are executed in parallel.

FIG. 6 shows an operation time chart of the processing of the example of the program shown in FIG. 4 in case an unissued instruction is not held in the instruction buffer 3. The time proceeds in the order of the machine cycles 701, 702, 703, 705, 706, 707, 708, etc.

In case an unissued instruction is not held in the instruction buffer 3, since the first unit of fetched instructions is directly sent to the instruction register unit 4 via the line 102, the possibility of parallel processing can not be judged. Therefore, in the machine cycles 703 and 704, the instructions 1e and 1o are issued by one instruction. And, the second, third and fourth units of fetched instructions are stacked in order in the machine cycles 704, 705 and 706. In the machine cycle 704, the instructions 2e and 2o to be next issued are held in the instruction register 6 for the second execution unit and the lowest buffer register of the instruction buffer 3, respectively. Then, the judgement part 10 judges that the instructions 2e and 2o can not be executed in parallel, and so only the instruction 2e is issued in the machine cycle 705.

In the machine cycle 705, the instructions 2o and 3e to be next issued are held in the instruction register 6 for the second execution unit and the lowest buffer register of the instruction buffer 3, respectively. Then, the judgement part 10 judges that the instructions 2o and 3e can be executed in parallel, and the instructions 2o and 3e are issued in the machine cycle 706. Further, in the machine cycle 706, the instructions 3o and 4e to be next issued are held in the lowest and next lowest buffer registers of the instruction buffer 3, respectively. Then, the judgement part 10 judges that the instructions 3o and 4e can be executed in parallel, and both of these instructions are issued in the machine cycle 707.

As explained above, in the first embodiment, the judgement part 10 is provided to determine the possibility of parallel processing as to the two instructions to be next issued. Then, the parallel processing is controlled by prohibition of writing the result executed by the second execution unit into the register 9 if the two instructions can not be executed in parallel. Therefore, the instruction register unit 4 has only to issue instructions.

Thus, since the decoding of instructions and the judgement on the possibility of parallel processing can be carried out in the same machine cycle, the operation frequency does not decrease.

Figure 7:
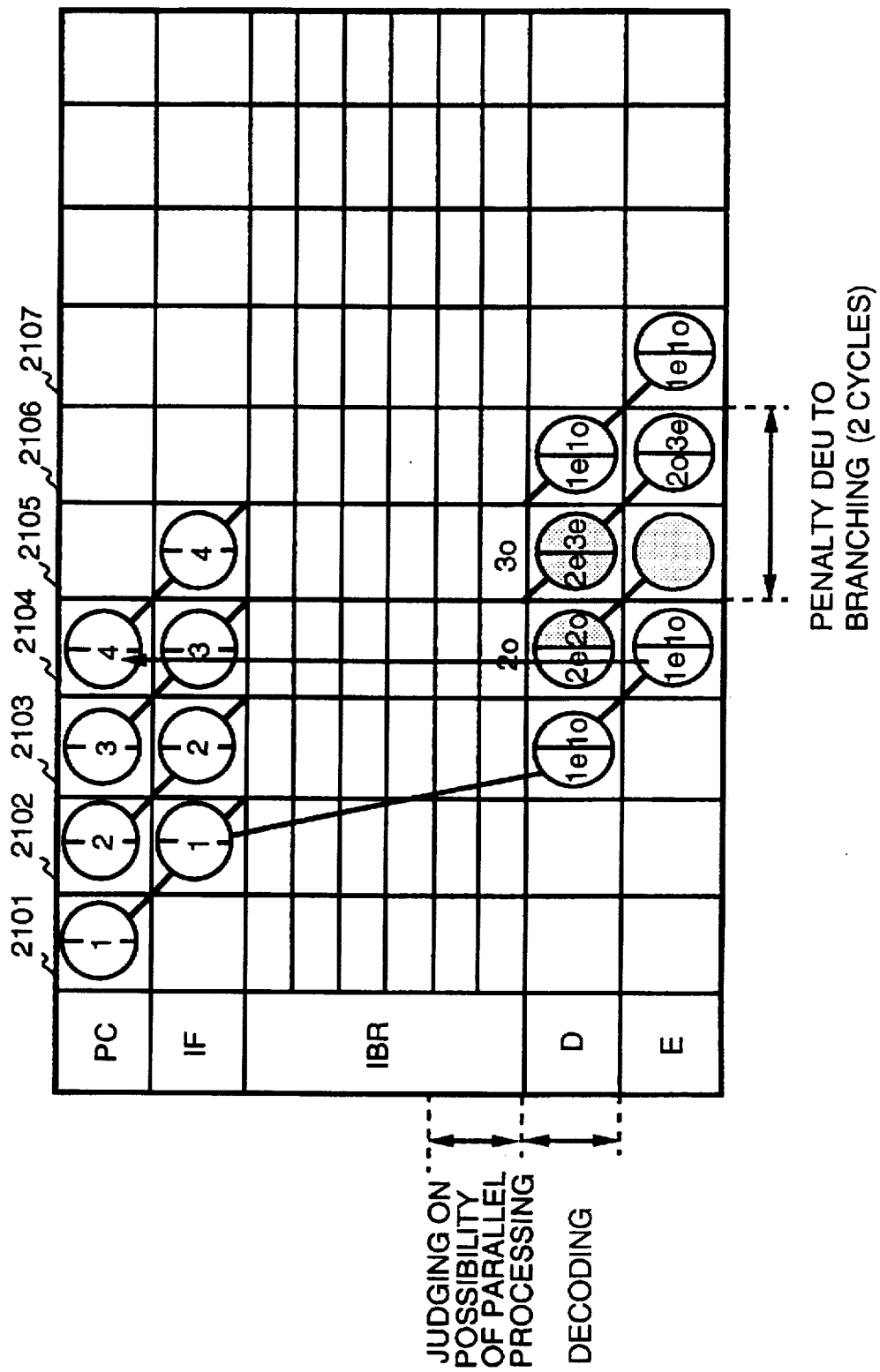
FIG. 7 is a time chart for explaining operations of processing a branch instruction in the first embodiment.
Figure 17:
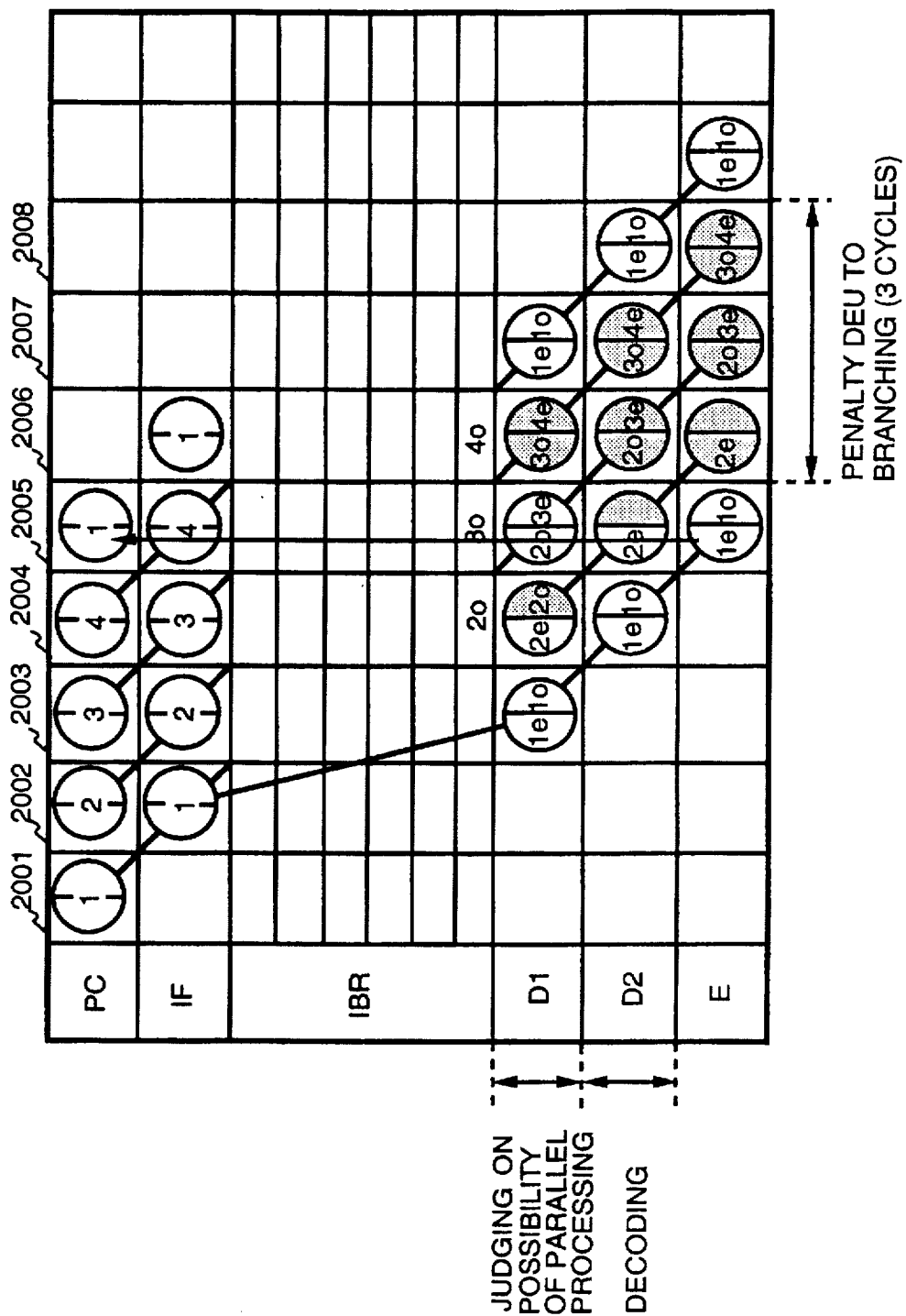
FIG. 17 is a time chart for explaining operations of processing branch instruction in the fourth embodiment.

Further, since it is not necessary to provide a stage exclusive to the judgement on the possibility of parallel processing, an increase in the number of machine cycles caused by instruction execution, such as branching, can be suppressed. For example, if a stage exclusive to the judgement on the possibility of parallel processing is provided, as explained for the second and fourth existing techniques with reference to FIG. 17, a penalty of 3 cycles is caused by execution of a branch instruction. On the other hand, by using the first embodiment of this invention, as shown in FIG. 7, the penalty can be reduced to a penalty of 2 cycles.

Further, by this embodiment, it is possible to judge the possibility of parallel processing as to all pairs of instructions to be next issued, as stored in the instruction register 4 and/or the instruction buffer 3. Therefore, by meas of this embodiment, the possibility of parallel processing can be judged also as to two successive instructions in different units of fetched instructions in addition to two instructions of the same unit of fetched instructions (a unit of instructions in one line) stored in the instruction cache, to which the possibility of parallel processing can be judged only by the fifth existing technique. Also, since the possibility of parallel processing, as to all pairs of two successive instructions to be executed, can be judged, the number of cases in which the parallel processing can be judged is increased, which improves the processing performance.

Figure 8:
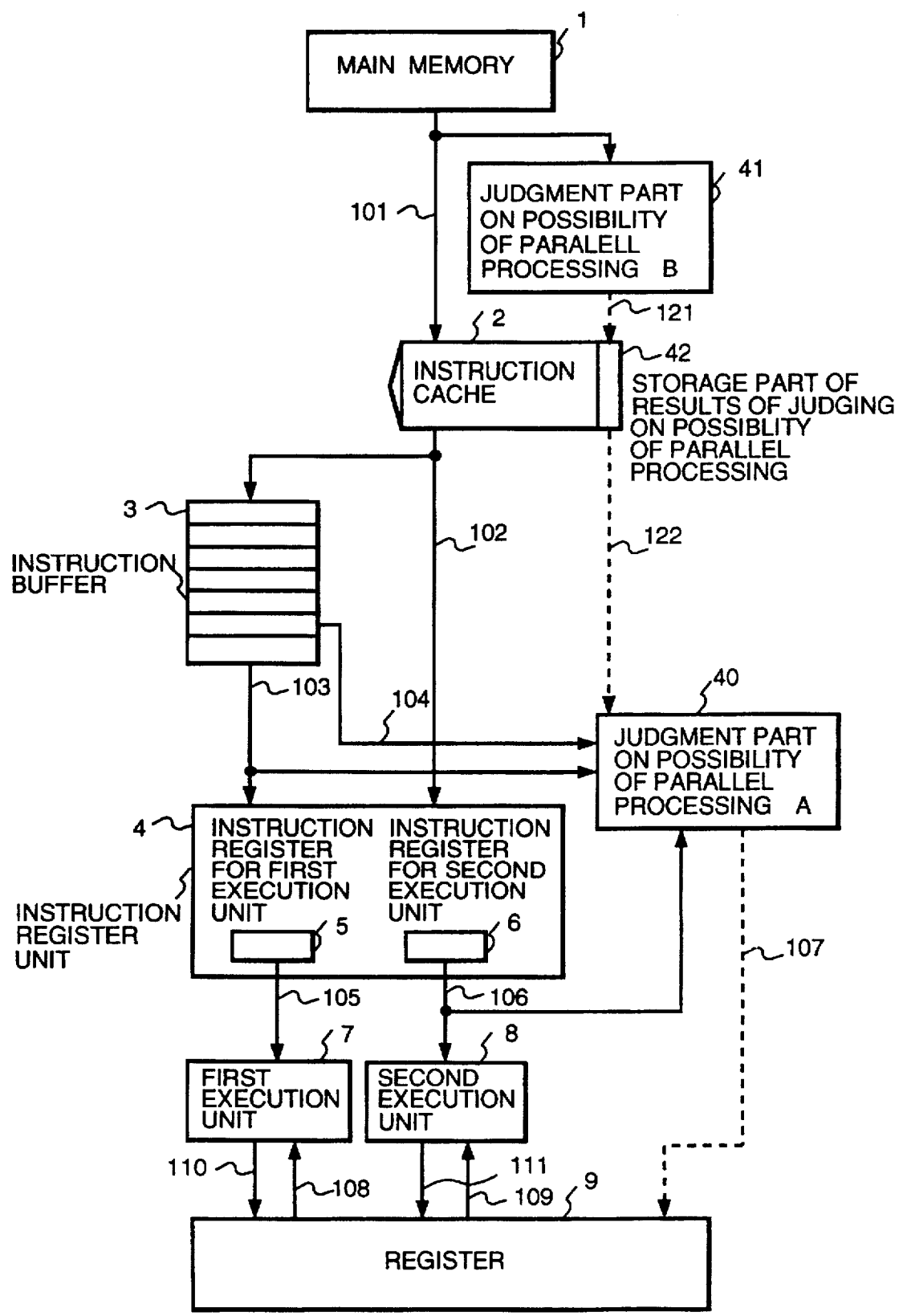
FIG. 8 is a schematic block diagram of a processor of the second embodiment.
Figure 9:
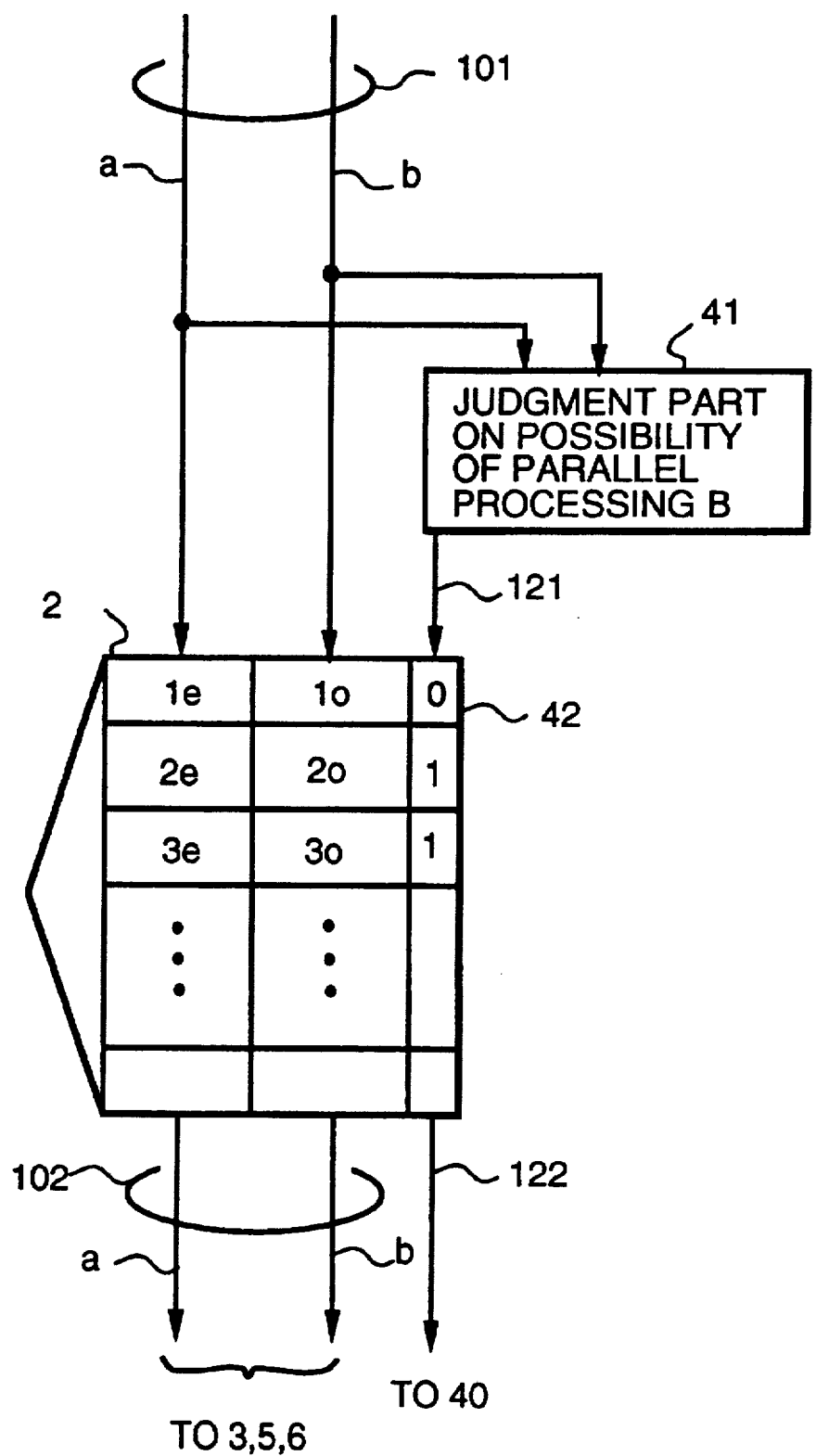
FIG. 9 is a schematic diagram of a judgement part B 41 on the possibility of parallel processing and a storage part 42 of results of the judgement on the possibility of parallel processing.
Figure 10:
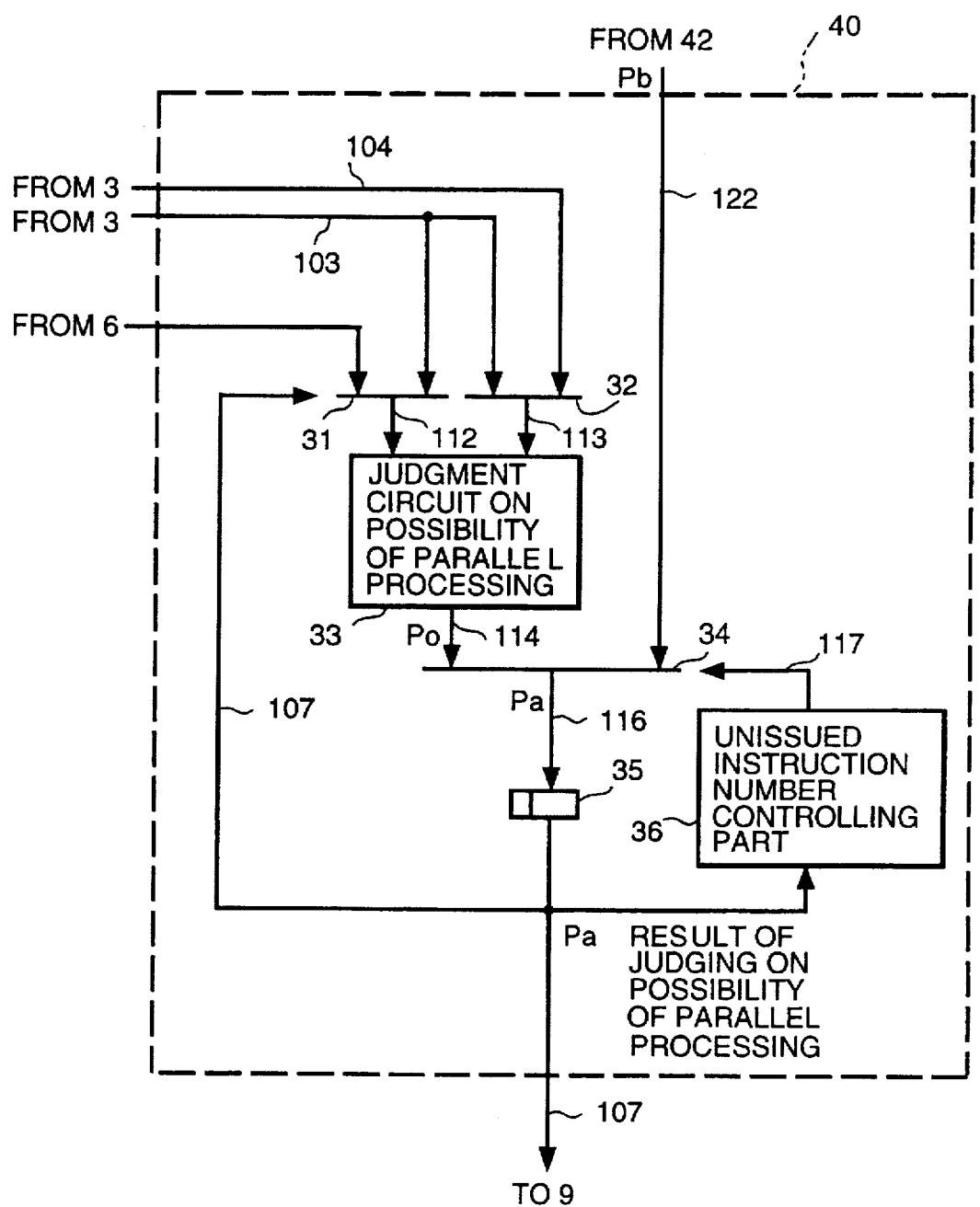
FIG. 10 is a schematic circuit diagram of a judgement part A 40 on the possibility of parallel processing which is a distinctive part of the second embodiment.
Figure 11:
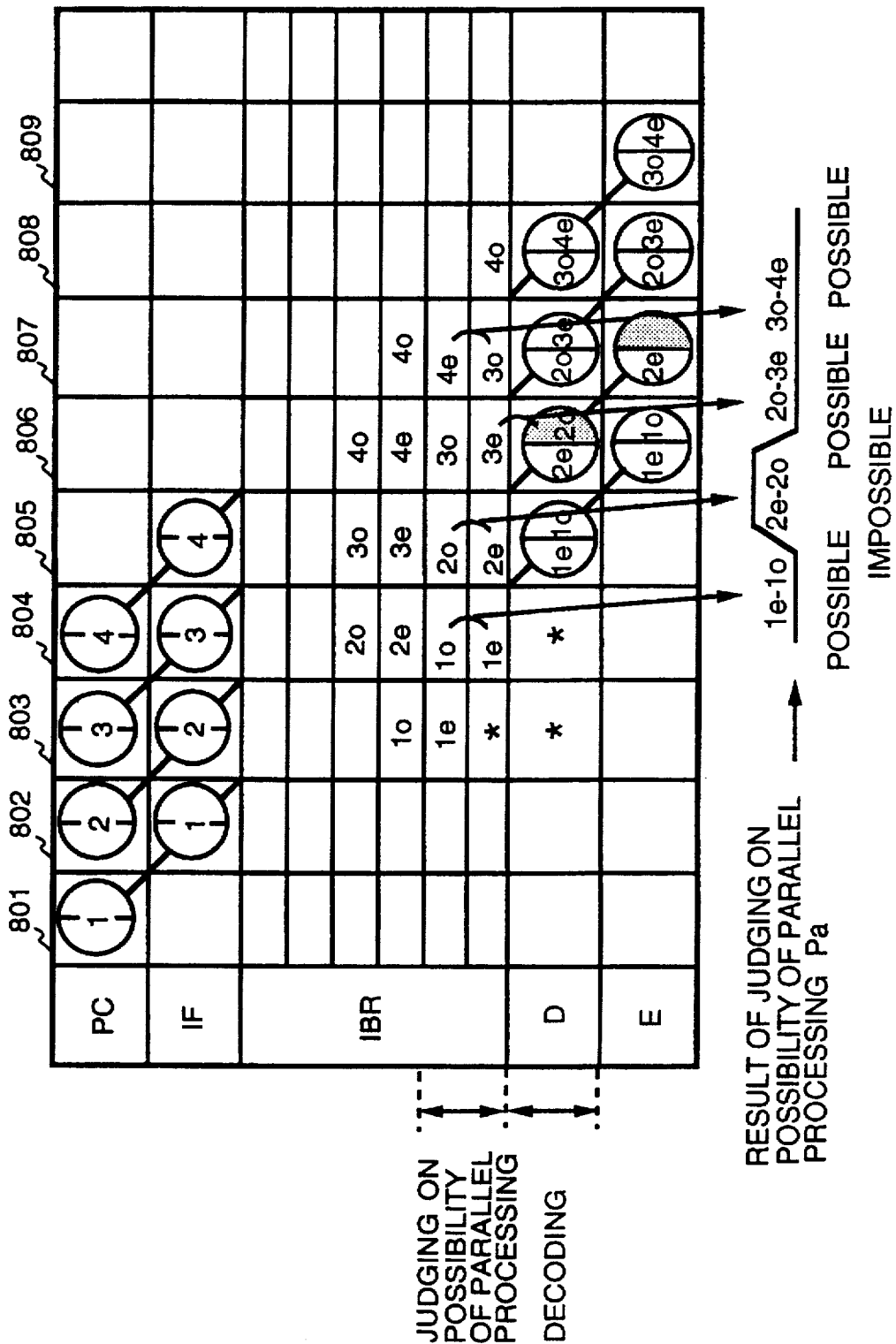
FIG. 11 is a time chart for explaining operations of the parallel processing in the second embodiment.
Figure 12:
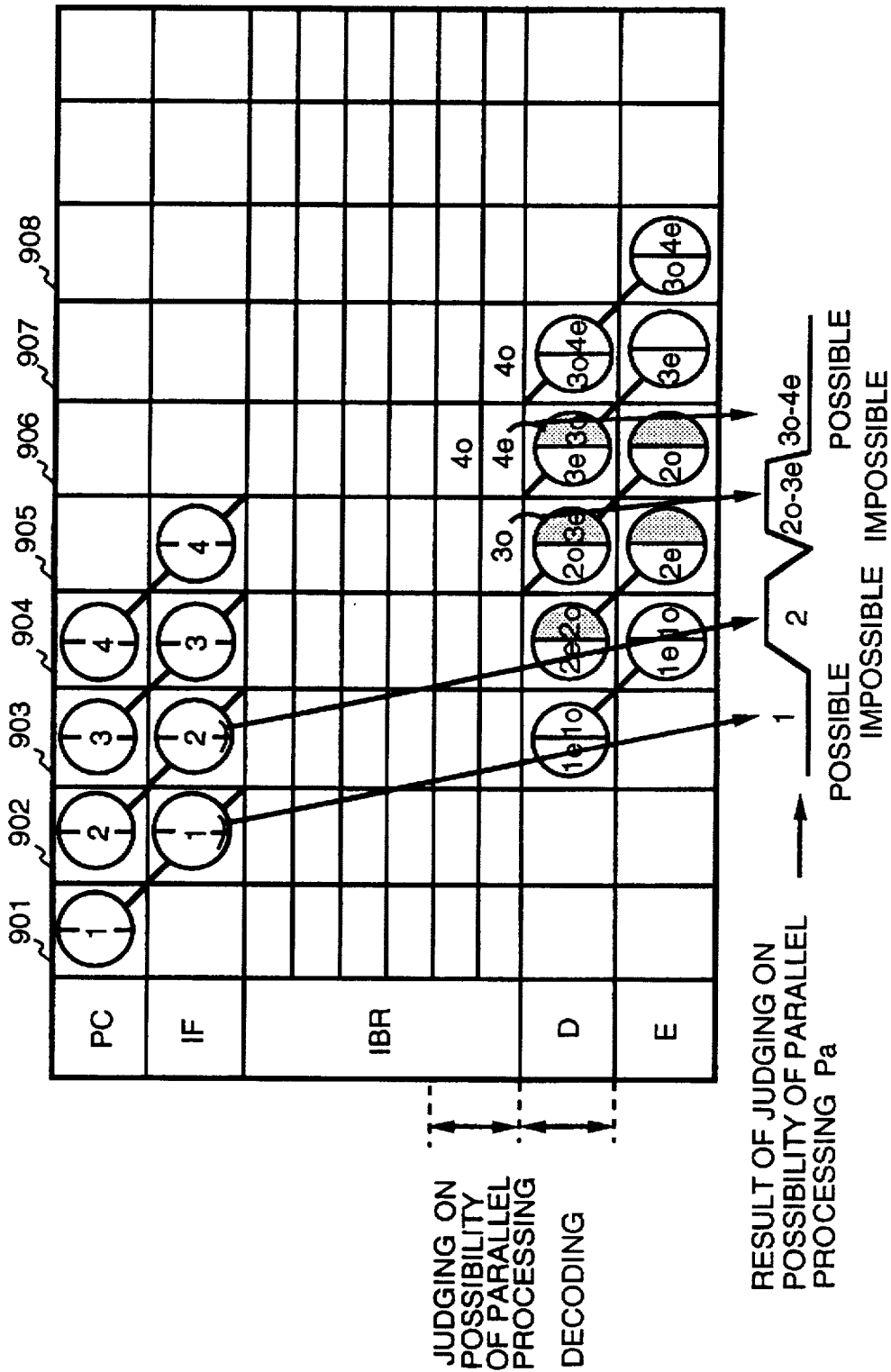
FIG. 12 is a time chart for explaining operations of the parallel processing in the second embodiment.
Figure 13:
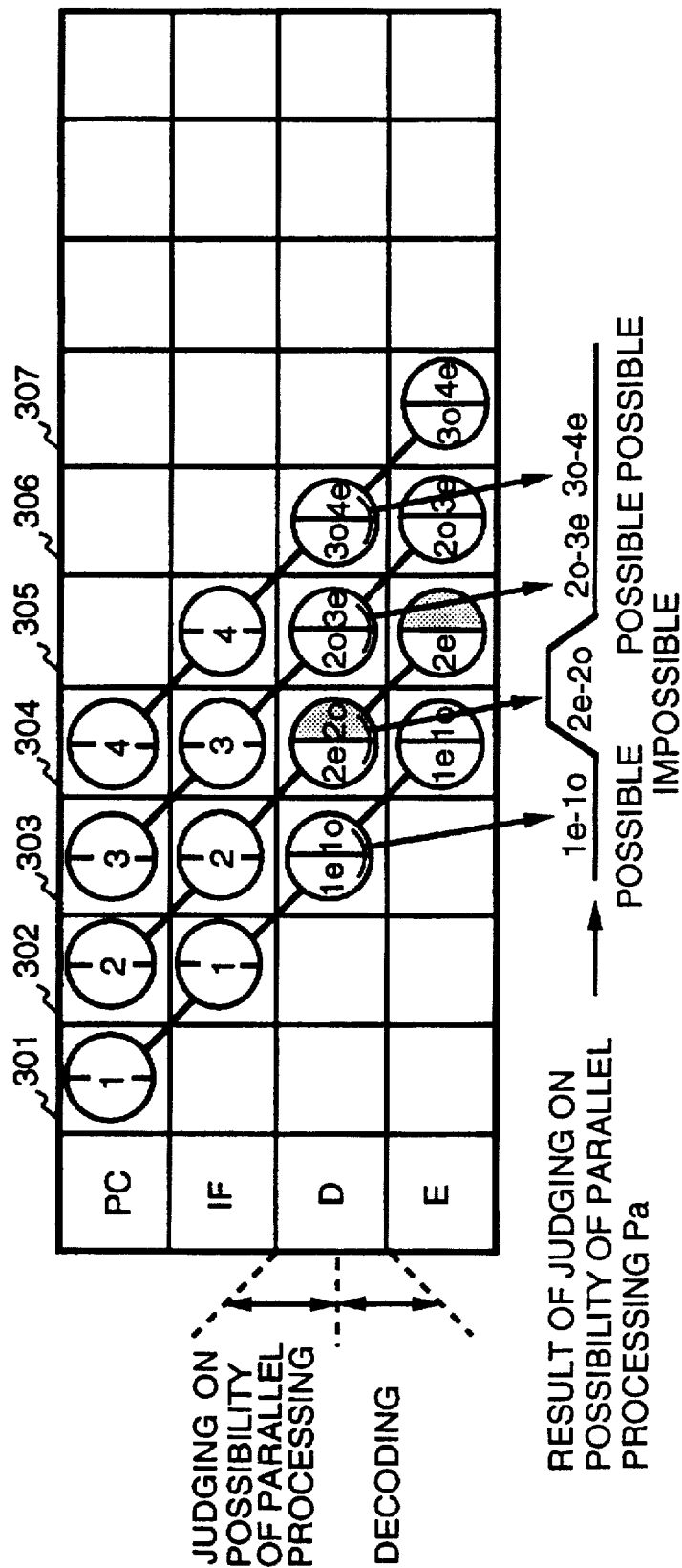
FIG. 13 is a time chart for explaining operation of parallel processing in the first existing technique.
Figure 14:
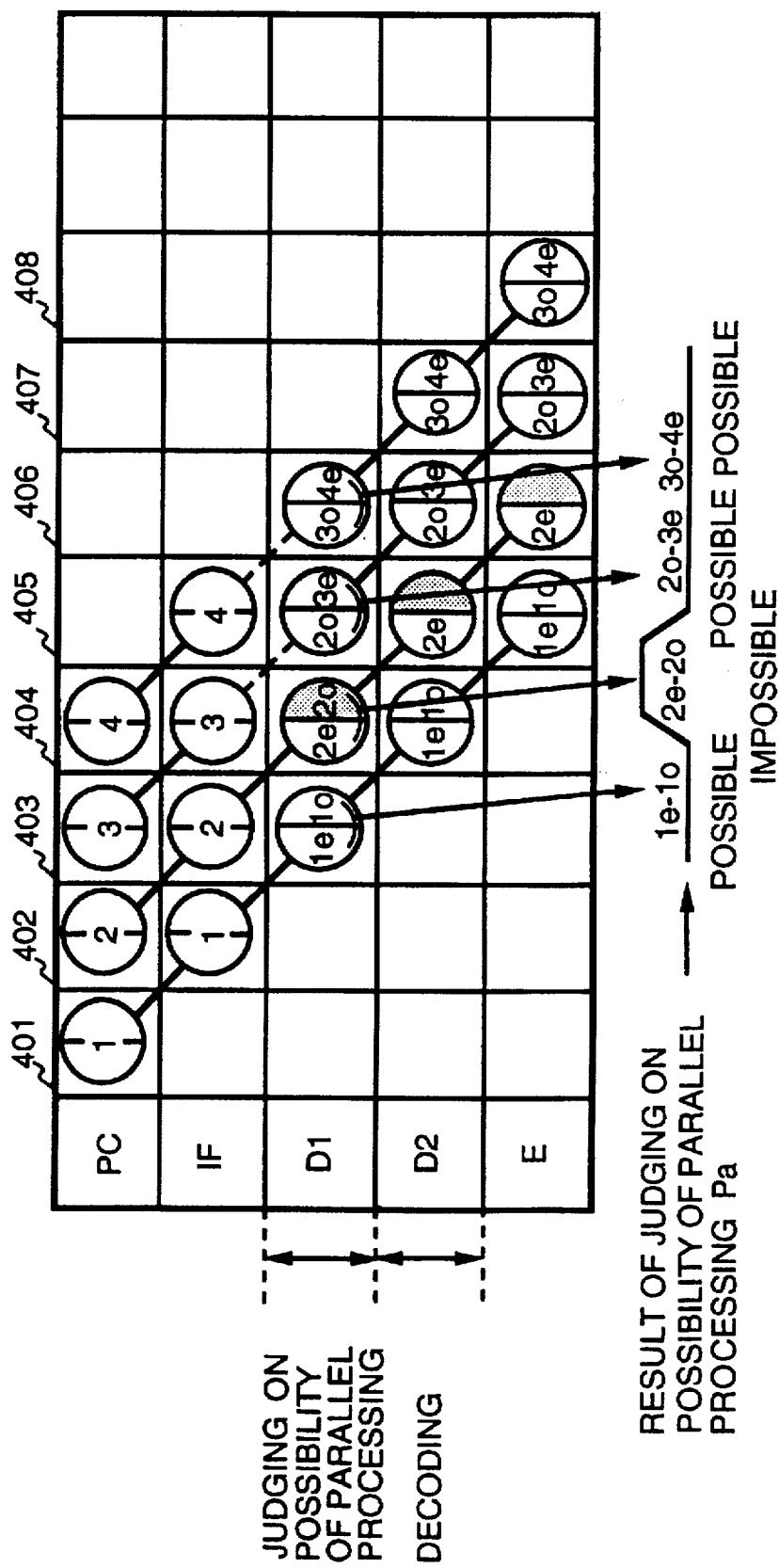
FIG. 14 is a time chart for explaining operation of parallel processing in the second existing technique.
Figure 15:
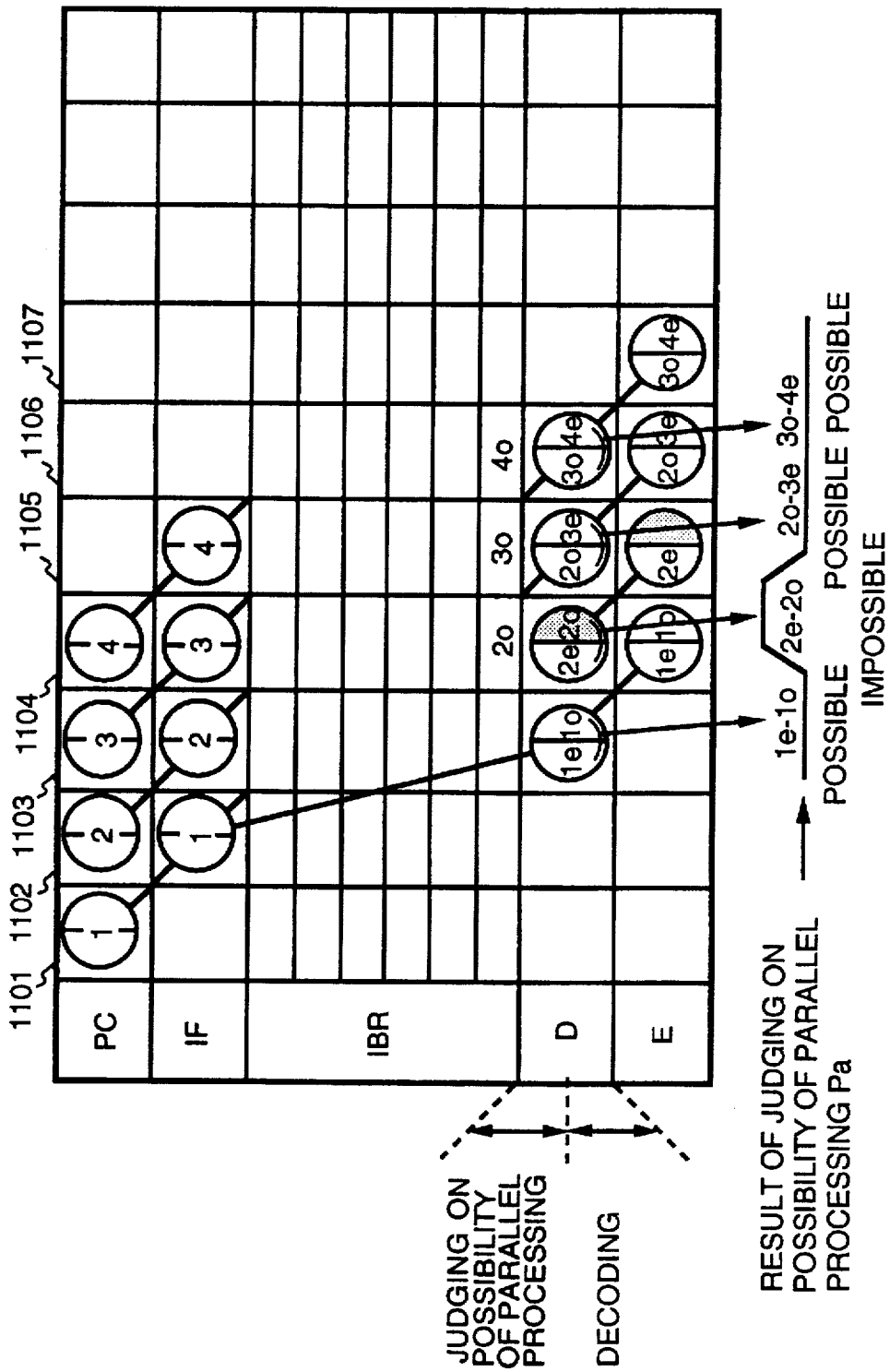
FIG. 15 is a time chart for explaining operation of parallel processing in the third existing technique.
Figure 16:
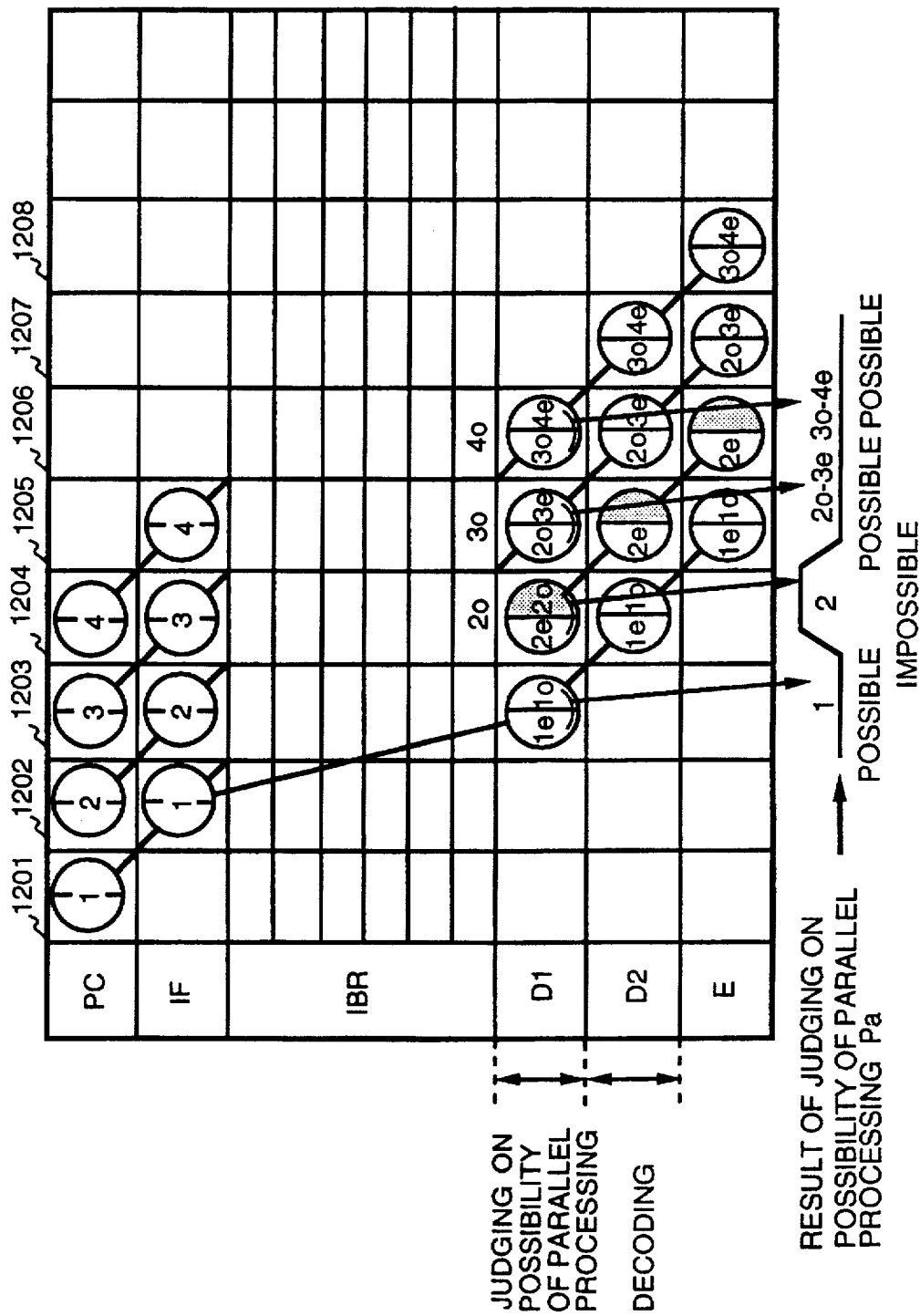
FIG. 16 is a time chart for explaining operation of parallel processing in the fourth existing technique.

By referring to FIGS. 8–12, a processor for parallel processing according to the second embodiment of this invention will be explained. FIG. 8 shows a main part of a processor relating to instruction level parallel processing, and FIGS. 9 and 10 show detailed compositions of main sub-parts, respectively. FIGS. 11 and 12 show operations of the parallel processing in the second embodiment.

In the above-mentioned embodiment shown in FIG. 1, since the possibility of parallel processing is judged as to two significant instructions in the instruction buffer 3 and/or the instruction register unit 4, the method of the embodiment is not applicable if less than two significant instructions are stored in the instruction buffer 3 and for the instruction register unit 4. That is, it is impossible to judge the possibility of parallel processing if two instructions are not transferred to the instruction buffer 3 and/or the instruction register unit 4 from the instruction cache 2.

This embodiment, which will be explained in detail in the following, makes it possible to judge the possibility of parallel processing even in the above-mentioned case. As shown in FIG. 8, a feature of the second embodiment is to provide another judgement part B 41 for determining the possibility of parallel processing besides the judgement part A 40 having the same composition as the judgement part of the embodiment shown in FIG. 1 and a storage part 42 of results of judging the possibility of parallel processing, and the other parts of the second embodiment are the same as the ones of the embodiment shown in FIG. 1.

The judgement part B 41 takes in two instructions to be transferred from the main memory 1 to the instruction cache 2, and judges whether it is possible to execute the taken in two instructions dealt with as one unit (two instructions stored in the same line of the instruction cache 2) in parallel. Then, each judgement result Pb for each unit of the fetched two instructions is stored in the storage part 42 of the instruction cache 2 via a line 121. And, each of the judgement results Pb stored in the storage part 42 is transferred to the judgement part A 40 via a line 122. The transferring timing of the judgement result Pb is the same as the timing by which the unit of fetched instructions corresponding to the judgement result is transferred from the instruction cache 2 to the instruction register unit 4.

A memory composition and a control part of the judgement part B 41 and the storage part 42 are composed as shown in FIG. 9. The judgement part B 41 has the same composition as the judgement circuit 33 shown in FIG. 3. The judgement part B 41 receives two instructions from the main memory 1 via the line 101. Then, it judges whether it is possible to execute the two instructions in parallel by a judgement method based on the contents of the instructions (kinds of processing such as addition, subtraction, multiplication, branching, etc.) and the interrelations between the addresses to which the execution results are to be stored and/or the addresses at which the data are to be fetched for the execution, and the judgement result Pb is stored in the storage part 42 of the instruction cache 2 via the line 121. In the storage part 42, one bit is provided for each unit of two fetched instructions, and each judgement result is written into the corresponding bit at the same time as the two instructions are written into the instruction cache 2, and the content of the bit is read out at the same time as the unit of fetched instructions is read out from the instruction cache 2.

In storing the judgement result Pb in the storage part 42, the judgement result Pb is stored in the same entry as the corresponding two instructions. Then, at the same time as the two instructions are read out from the instruction cache 2 via the lines 102a and 102b, the judgement result Pb 122 corresponding to the two instructions is read out.

Although the storage part 42 is provided in the instruction cache 2 in this embodiment, the location of the storage part is not restricted to the instruction cache; any place capable of storing the judgement result Pb in order is available.

In the following, the operations of the second embodiment will be explained.

If two significant instructions are held in the instruction buffer 3, the instruction register unit 4 receives the two instructions via the line 103 and sets the instruction to be first executed into the instruction register 5 and the instruction to be next executed into the instruction register 6. If two significant instructions were not held in the instruction buffer 3 and the instruction register nit 4 in the previous cycle, the instruction register unit 4 receives two instructions directly from the instruction cache 2 via the line 102.

The judgement part A 40 is configured as shown in FIG. 10 nd its basic operations are the same as those described with reference to FIG. 3. That is, if not less than two significant instructions are stored in the instruction buffer 3 and/or the instruction register 4 in the previous cycle, the judgement part A 40 judges the possibility of parallel processing as to the two instructions sent from the instruction buffer 3 in the present cycle or as to the instruction remaining in the instruction register 6 and te instruction stored in the lowest buffer register of the instruction buffer, and the judgement result Pa is outputted. However, if less than two significant instructions are stored in the instruction buffer 3 and the instruction register 4 in the previous cycle, the above-mentioned judgement is impossible. In such case, the unissued instruction number controlling part 36 selects the judgement result Pb transferred from the storage part 42, and sets Pb as Pa.

The register 9 which received the judgement result Pa controls writing of execution results from the execution units into the register 9 in accordance with the number of issued instructions in the previous cycle. That is, if the judgement result Pa is "0", the execution results of the first and second execution units 7 and 8 both are written into the register 9 since the two instructions could be issued. On the other hand, if the judgement result Pa is "1", since only one instruction was issued, it is prohibited to write the execution result of the second execution unit 8 into the register 9.

By referring to the time charts shown in FIGS. 11 and 12, the operations of the second embodiment will be explained in the following. FIG. 11 shows the operation time chart of the second embodiment along which the program shown in FIG. 4, implemented in a case wherein unissued instructions are held in the instruction buffer 3 and the instruction register unit 4. However, since the operations shown in FIG. 11 are the same as those of the first embodiment shown in FIG. 5, a detailed explanation of these operations is omitted here.

FIG. 12 shows an operation time chart of the second embodiment according to which the program shown in FIG. 4 is implemented in a case wherein an unissued instruction is not held in the instruction buffer 3, and this example shows a distinct feature of the second embodiment. The time elapses in the order of the machine cycles 901, 902 . . . . . 908. Since an unissued instruction is not held in the instruction buffer 3, first and second units of fetched instructions are directly sent to the instruction register unit 4 via the line 102. At the same time, the judgement results Pb corresponding to the first and second units of fetched instructions are read out from the storage part 42 in the instruction cache 2, and sent to the register 9 as the judgement result Pa, representing the possibility of parallel processing. As to the first unit of fetched instructions, since the two instructions of the first unit can be executed in parallel, the instructions 1e and 1o are issued at the same time in the machine cycle 903. As to the second unit of fetched instructions, since the two instructions of the second unit can not be executed in parallel, only the instruction 2e is equivalently issued in the machine cycle 904. On the other hand, the third and fourth units of fetched instructions are successively stacked in the instruction buffer 3 in the order of the machine cycles 905 and 906. In the machine cycle 905, the instructions 3e and 3o to be next issued are held in the instruction register 6 for the second execution unit and the lowest buffer register in the instruction buffer 3. However, in this case, it is judged by the judgement part A 40 that the instructions 3e and 3o can not be executed in parallel, and so only the instruction 3e is substantially issued as a significant instruction in the machine cycle 906. In the machine cycle 906, the instructions 3o and 4e to be next issued are held in the instruction register 6 for the second execution unit and the lowest buffer register in the instruction buffer 3. And, in this case, it is judged by the judgement part A 40 that the instructions 3o and 4e can be executed in parallel, and so the instructions 3o and 4e are issued in the machine cycle 907.

Like the first embodiment, the second embodiment judges the possibility of parallel processing as to the two instructions stored in the instruction buffer 3 and/or the instruction register unit 4. Then, the instruction register unit 4 has only to issue instructions.

Also, in the first embodiment, if two instructions to be next issued are not held in the instruction buffer 3 and/or the instruction register unit 4, the instruction issuance is carried out successively by one instruction since the possibility of parallel processing can not be judged. On the other hand, in the second embodiment, even if two instructions to be next issued are not held in the instruction buffer 3 or the instruction register unit 4, parallel processing control is possible for each unit of fetched instructions by using the judgement result Pb which was obtained by the judgement part B 41 judging the possibility of parallel processing as to the unit of fetched instruction at the time of storing the unit of fetched instructions into the instruction cache 2. Therefore, the second embodiment can increase the probability of parallel processing in comparison with the first embodiment, which improves the computing speed of a processor.

As mentioned above, it is possible according to the present invention to judge all pairs of instructions stored in the order of execution without decreasing the operation frequency and without the need for an additional processing stage, which improves the performance of the processor.

What is claimed is:

1. Method of realizing instruction level parallel processing, said method comprising the steps of:

writing a plurality of sets of instructions fetched from a memory into an instruction cache and simultaneously judging whether it is possible to execute each of said plurality of sets of fetched instructions in parallel;

storing instructions from said instruction cache in an instruction buffer until said instructions are to be issued from said instruction buffer;

sending said stored instructions to an instruction register unit for issuing said send instructions to a plurality of execution unit in an order of execution;

judging whether it is possible to execute a set of unissued instruction to be next issued, in parallel, based on a result of said judging carried out during the writing of said set of unissued instructions into said instruction cache if the number of instructions stored in said instruction buffer and said instruction register unit is less than the number of said plurality of execution units, and judging, in addition to the judging carried out during the writing of said set of unissued instructions into said instruction cache, whether it is possible to execute said set of unissued instructions stored in said instruction buffer and/or said instruction register unit in parallel if the number of instructions stored in said instruction buffer and the instruction register unit is not less than the number of said plurality of execution units; and controlling parallel processing of said set of instructions based on a result of judging on the possibility of parallel processing.

2. Method of realizing instruction level parallel processing according to claim 1, wherein the step of judging the possibility of parallel processing as to a set of unissued instructions to be next issued is carried out by using contents of said instruction register unit, information on instructions stored in said instruction buffer and a result of judgement on the possibility of parallel processing in a previous machine cycle.

3. Apparatus for realizing instruction level parallel processing, said apparatus comprising:

an instruction cache for writing therein a plurality of sets of instructions fetched from a memory;

a first judgement part for judging whether it is possible to execute each of said plurality of sets of fetched instructions, in parallel, at the same time each of said plurality of sets of fetched instructions are written into said instruction cache;

a storage part for storing results of judging carried out by said first judgement part;

an instruction buffer for fetching and storing instructions written in said instruction cache until said instructions are to be issued from said instruction buffer;

an instruction register unit for storing instructions and for issuing said instructions to a plurality of execution units in an order to execution;

a second judgement part for judging whether it is possible to execute a set of unissued instructions to be next issued, in parallel, based on results of judging stored in said storage part by said first judgement part during writing of said set of unissued instructions into said instruction cache if the number of instructions stored in said instruction buffer and said instruction register unit is less than the number of said plurality of execution units, and further judging whether it is possible to execute said set of unissued instructions to be next issued, as stored in said instruction buffer and/or said instruction register, if the number of instructions stored in said instruction buffer and the instruction register unit is not less than the number of said plurality of execution units, and for controlling parallel processing of said set of instructions based on a result of judging the possibility of parallel processing.

4. Apparatus for realizing instruction level parallel processing according to claim 3, wherein both of said first and second judgement parts judge the possibility of parallel processing as to a set of unissued instructions to be next issued, by using contents of said instruction register unit, information on instructions stored in said instruction buffer and a result of judging the possibility of parallel processing in a previous machine cycle.

5. Apparatus for realizing a instruction level parallel processing according to claim 3, wherein, if parallel processing of set of instructions is judged impossible, the parallel processing of said set of instructions is equivalently suppressed and each one of said set of instructions is executed one by one in order.

6. Apparatus for realizing a instruction level parallel processing according to claim 4, wherein, if parallel processing of a set of instructions is judged impossible, the parallel processing of said set of instructions is equivalently suppressed and each one of said sets of instructions is executed one by one in the order.

7. Method for realizing instruction level parallel processing, said method comprising the steps of:

storing instructions, fetched from a memory, in an instruction buffer until said instructions are to be sent from said instruction buffer;

sending said stored instructions to an instruction register unit for issuing said sent instructions to a plurality of execution units in an order of instruction execution;

judging whether it is possible to execute a set of unissued instructions to be next issued, in parallel, as stored in said instruction buffer and/or said instruction register unit, when the number of unissued instruction stored in said instruction buffer and/or said instruction register unit is not less than the number of said execution units, by using contents of said instruction register unit, information on instructions stored in said instruction buffer and a result of said judgment on the possibility of parallel processing in a previous machine cycle; and controlling parallel processing of said set of instructions, based on said result of said judgement on the possibility of parallel processing.

8. Apparatus for realizing instruction level parallel processing, said apparatus comprising:

an instruction buffer for storing instructions fetched from a memory until said instructions are to be sent from said instruction buffer;

an instruction register unit for storing and issuing instructions to a plurality of execution units in the order of execution; and a judgement part for judging whether it is possible to execute a set of unissued instructions to be next issued, in parallel, as stored in said instruction buffer and/or said instruction register unit, when the number of unissued instruction stored in said instruction buffer and/or said instruction register unit is not less than the number of said execution units, by using contents of said instruction register unit, information on instructions stored in said instruction buffer and a result of said judgement on the possibility of parallel processing in a previous machine cycle, and controlling parallel processing of said set of instructions based on a result of said judging the possibility of parallel processing.

9. Apparatus for realizing a instruction level parallel processing, said apparatus comprising:

an instruction buffer for storing instructions fetched from a memory until said instructions are to be sent from said instruction buffer;

an instruction register unit for storing and issuing instructions to a plurality of execution units in the order of execution; and a judgement part for judging whether it is possible to execute a set of unissued instructions to be next issued, in parallel, as stored in said instruction buffer and/or said instruction register unit, when the number of unissued instruction stored in said instruction buffer and/or said instruction register unit is not less than the number of said execution units, wherein, if parallel processing of said set of instructions is judged impossible, the parallel processing of said set of instructions is equivalently suppressed and each one of said set of instructions is executed by one in the order of execution.

10. Apparatus for realizing a instruction level parallel processing according to claim 8, wherein, if parallel processing of said set of instructions is judged impossible, the parallel processing of said set of instructions is equivalently suppressed and each one of said sets of instructions is executed one by one in the order of execution.

11. Apparatus for realizing instruction level parallel processing, said apparatus comprising:

an instruction cache for writing therein a plurality of sets of instructions fetched from a memory;

a first judgement part for judging whether it is possible to execute each of said plurality of sets of fetched instructions, in parallel, at the same time each of said plurality of sets of fetched instructions are written into said instruction cache;

a storage part for storing results of judging carried out by said first judgment part;

an instruction buffer, for fetching and storing instruction written in said instruction cache until said instruction are to be issued from said instruction buffer;

an instruction register unit for storing instructions and for issuing said instructions to a plurality of execution units in an order to execution; and a second judgment part including a judgment circuit for judging whether it is possible to execute a set of unissued instructions to be next issued, in parallel, further for selecting one of a corresponding one of said results of judging carried out by said first judgment part and stored in said storage part, and a result of judging carried out by said judgment circuit, based on comparison between the number of unissued instructions, as stored in said instruction buffer and/or said instruction register unit, and the number of said plurality of execution units, and for controlling parallel processing of said plurality of execution units on the basis of said selected result.

12. Apparatus for realizing instruction level processing, said apparatus comprising:

an instruction cache for writing therein a plurality of sets of instructions fetched from a memory;

a first judgment part of judging whether it is possible to execute each of said plurality of sets of fetched instructions, in parallel, at the same time each of said plurality of sets of fetched instructions are written into said instruction cache;

a storage part for storing results of judging carried out by said first judgment part;

an instruction buffer for fetching and storing instruction written in said instruction cache until said instruction are to be issued from said instruction buffer;

an instruction register unit for storing instructions and for issuing said instructions to a plurality of execution units in an order to execution; and a second judgment part for judging whether it is possible to execute a set of unissued instructions to be next issued, in parallel, based on comparison between the number of unissued instructions, as stored in said instruction buffer and/or said instruction register unit, and the number of said plurality of execution units, and for controlling parallel processing of said plurality of execution units based on a corresponding one of said results of said judging carried out by said first judgment part and stored in said storage part, if judging the possibility of parallel processing of said set of unissued instructions to be next issued, in parallel, is not possible based on the comparison between said two numbers.

* * * * *